(12) United States Patent
Yano et al.

(10) Patent No.: US 6,240,165 B1
(45) Date of Patent: May 29, 2001

(54) COMMUNICATION SUPPORT SYSTEM IN WHICH A CALLER PROFILE FROM A DATA PROCESSING DEVICE IS TRANSMITTED TO A TELEPHONE DEVICE UPON INCOMING OF A CALL

(75) Inventors: Katsutoshi Yano; Tomoyoshi Takebayashi; Toshihiro Azami; Jun Kakuta; Kimikazu Furukawa; Yasuo Sato, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/049,088

(22) Filed: Mar. 27, 1998

(30) Foreign Application Priority Data

Sep. 19, 1997 (JP) .................................................. 9-255796

(51) Int. Cl.[7] ................................................... H04M 1/64
(52) U.S. Cl. ........................................ 379/88.21; 379/142
(58) Field of Search ........................... 379/67.1, 88.12, 379/88.13, 88.16, 88.19, 88.2, 88.21, 93.01, 93.17, 93.23, 100.01, 100.15, 142, 156, 165

(56) References Cited

U.S. PATENT DOCUMENTS

| 4,551,581 | * | 11/1985 | Doughty | 379/93.14 |
| 4,582,956 | * | 4/1986 | Doughty | 379/93.14 |
| 4,720,848 | * | 1/1988 | Akiyama | 379/88.21 |
| 5,007,076 | * | 4/1991 | Blakley | 379/88.21 |
| 5,263,084 | * | 11/1993 | Chaput et al. | 379/215 |
| 5,457,738 | * | 10/1995 | Sylvan | 379/93.23 |
| 5,526,406 | * | 6/1996 | Luneau | 455/563 |
| 5,528,680 | * | 6/1996 | Karpicke | 379/355 |
| 5,604,790 | * | 2/1997 | Grimes | 379/88.04 |
| 5,646,979 | * | 7/1997 | Knuth | 455/563 |
| 5,796,806 | * | 8/1998 | Birckbichler | 379/88.2 |
| 5,892,764 | * | 4/1999 | Riemann et al. | 370/401 |
| 5,903,632 | * | 5/1999 | Brandon | 379/93.23 |

FOREIGN PATENT DOCUMENTS

| 2-177648 | 7/1990 | (JP) . |
| 4-061543 | 2/1992 | (JP) . |
| 4-196853 | 7/1992 | (JP) . |
| 5-056190 | 3/1993 | (JP) . |
| 5-075823 | 3/1993 | (JP) . |
| 5-316195 | 11/1993 | (JP) . |
| 8-030352 | 2/1996 | (JP) . |
| 8-237299 | 9/1996 | (JP) . |
| 9-116940 | 5/1997 | (JP) . |

* cited by examiner

Primary Examiner—Fan Tsang
Assistant Examiner—Roland G. Foster
(74) Attorney, Agent, or Firm—Staas & Halsey LLP

(57) ABSTRACT

A communication support system includes a caller ID detection unit which detects a caller ID sent from a telephone network upon incoming of a call. A line switching unit switches on a first line between a voice signal path from a telephone set and a voice signal path from the telephone network before the connection between the telephone set and the telephone network is established. The line switching unit switches off the first line and switches on a second line between the voice signal path from the telephone set and a voice signal path from a data processing device after the caller ID is detected by the caller ID detection unit. The data processing device has a main control unit which retrieves a caller profile from a database in response to the caller ID detected by the caller ID detection unit, and transmits a. synthesized voice signal indicating the caller profile to the telephone set through the second line when the line switching unit switches on the second line.

18 Claims, 28 Drawing Sheets

FIG. 28A

DATA MANAGEMENT TABLE

| NUMBER OF ENTEIRS |

$i = 0$
- TELEPHONE: 9 3 8 2 0 6 2
- NAME : TARO YAMADA
- DATE OF INPUT: 3／2／96
- DATE OF UPDATE :
- COMPANY : X Y Z C O.
- ADDRESS: ⋯, AKASHI, HYOGO

⋮

$n-1$ $n$
- TELEPHONE :
- NAME :
- DATE OF INPUT :
- DATE OF UPDATE :
- COMPANY :
- ADDRESS :

FIG. 28B

EXAMPLE OF DISPLAY DATA

COMPANY: X Y Z  C O.

NAME : TARO YAMADA

ADDRESS: ・・・, AKASHI, HYOGO

TELEPHONE: 9 3 8 2 0 6 2

(CALLER ID = 9 3 8 2 0 6 2)

FIG. 29A

DTMF COMMAND LIST

| VOICE RECORDING START |
| --- |
| * 1 |
| VOICE RECORDING END |
| * 2 |
| . . . . |
| MUTE |
| * 6 |

FIG. 29B

EXAMPLE OF DISPLAY DATA

```
VOICE RECORDING START    * 1
VOICE RECORDING END      * 2
        .                 .
        .                 .
        .                 .
        .                 .
        .                 .
MUTE                     * 6
```

TELEPHONE DIRECTORY

EXAMPLE OF DISPLAY DATA

COMMUNICATION SUPPORT SYSTEM IN WHICH A CALLER PROFILE FROM A DATA PROCESSING DEVICE IS TRANSMITTED TO A TELEPHONE DEVICE UPON INCOMING OF A CALL

BACKGROUND OF THE INVENTION

(1). Field of the Invention

The present invention relates to a communication support system which is adapted to connect a telephone set through a communication control device to a data processing device and adapted to connect a telephone network to the communication control device, wherein a caller ID from the telephone network is displayed on a display of the telephone set upon incoming of a call. Further, the present invention relates to a computer readable medium which stores program code instructions for causing a processor to execute a caller ID service processing in response to incoming of a call from a telephone network.

Personal computers for home use are becoming widespread. Modems have now been shrunk to a chip size and included more and more in personal computers. The increasing prevalence of the personal computers having a built-in modem makes it easier to access the Internet or other communication networks through telephone lines. In recent years, the telephone lines have been shared by the computers and the telephones.

In recent developments, there is a demand for a useful, advanced communication support system which enables a telephone user to use a telephone set to remotely control the data processing device in order to obtain computer-assisted telephone services. Currently, the computer-assisted telephone services are provided only by locally operating the data processing device, and the telephones and the computers are separately used. Further, it is expected to provide a communication support system which allows the telephone user to easily transmit data to or receive data from other communication media.

(2). Description of the Related Art

In a case in which a caller ID service is provided by a caller ID service provider, a dedicated terminal which is specifically designed for the caller ID service may be used to obtain the caller ID service. If the dedicated terminal is used, a caller ID (and/or a caller name) from the service provider is displayed on a display of the dedicated terminal upon incoming of a call from a public switched telephone network. A user of the dedicated terminal can see the caller ID on the display before the user (he or she) accepts the call and goes off-hook.

Further, a conventional communication support system which is adapted to connect a telephone set through a modem to a data processing device (or a personal computer) and adapted to connect a telephone network to the modem may be used to utilize the caller ID service. If the conventional communication support system is used, a caller ID is displayed on a monitor of the data processing device upon incoming of a call from a public switched telephone network by executing an application program installed in the data processing device. A user of the conventional system can see the caller ID on the monitor of the data processing device before the user (he or she) accepts the call and goes off-hook.

FIG. 31 shows a conventional caller ID service processing performed when the dedicated terminal or the conventional communication support system is used.

The conventional caller ID service processing when the dedicated terminal is used is performed as follows.

As shown in FIG. 31, at the start of the conventional caller ID service processing, the dedicated terminal is started in an idle state (S201). When an incoming call from the telephone network is received, the dedicated terminal detects a caller ID sent by the service provider and displays the caller ID on the display of the dedicated terminal (S202). If a corresponding caller name for the caller ID is stored, in advance, in the dedicated terminal, not only the caller ID but also the corresponding caller name is displayed on the display. A user of the dedicated terminal can see the caller ID on the display of the dedicated terminal before he or she accepts the call and goes off-hook.

When the user picks up the handset of the dedicated terminal, an off-hook signal from the dedicated terminal is transmitted to the telephone network. A connection between the dedicated terminal and the telephone network is established (S203). The user of the dedicated terminal can communicate with the caller in the telephone network by voice.

Further, the conventional caller ID service processing for the conventional communication support system is performed as follows.

As shown in FIG. 31, at the start of the conventional caller ID service processing, the conventional communication support system is started in an idle state (S201). When an incoming call is received, the modem of the conventional communication support system detects a caller ID sent by the service provider and transmits the caller ID to the data processing device (S202). When the caller ID from the modem is received, the data processing device displays the caller ID on the monitor of the data processing device (S202). If a corresponding caller name for the caller ID is stored, in advance, in the data processing device, not only the caller ID but also the corresponding caller name is displayed on the monitor. A user of the data processing device can see the caller ID on the monitor of the data processing device before he or she accepts the call and goes off-hook.

When the user picks up the handset of the telephone set of the conventional communication support system, an off-hook signal from the telephone set is transmitted to the telephone network. A connection between the telephone set and the telephone network is established (S203). The user of the telephone set can communicate with the caller in the telephone network by voice.

Currently, the use of cordless telephones has become widespread, and a user of a cordless telephone is not necessarily able to see the display of the dedicated terminal or the monitor of the personal computer upon incoming of a call. If the user wants to know who has called him or her before accepting the call and going off-hook, he or she must go nearby the dedicated terminal or the personal computer. This is inconvenient for the user of the cordless telephone in the conventional communication support system.

SUMMARY OF THE INVENTION

An object of the present invention is to provide an improved communication support system which can solve the above-mentioned problems.

Another object of the present invention is to provide a communication support system which enables a telephone user to know caller profile, sent from a data processing device, on a telephone set upon incoming of a call.

Still another object of the present invention is to provide a communication control device for a communication support system including a telephone set and a data processing device, which enables a telephone user to know caller profile, sent from a data processing device, on a telephone set upon incoming of a call.

A further object of the present invention is to provide a method of executing a telephone service processing in a communication support system which enables a telephone user to know caller profile, sent from a data processing device, on a telephone set upon incoming of a call.

Another object of the present invention is to provide a computer readable medium storing program code instructions which cause a processor to execute a telephone service processing in a communication support system which enables a telephone user to know caller profile, sent from a data processing device, on a telephone set upon incoming of a call.

The above-mentioned objects of the present invention are achieved by a communication support system which is adapted to connect a telephone set through a communication control device to a data processing device and adapted to connect a telephone network to the communication control device, the communication support system comprising: the communication control device which has a first line between a voice signal path from the telephone set and a voice signal path from the telephone network and a second line between the voice signal path from the telephone set and a voice signal path from the data processing device; a caller ID detection unit which detects a caller ID sent from the telephone network upon incoming of a call; a line switching unit which switches on the first line before a connection between the telephone set and the telephone network is established, and switches off the first line and switches on the second line after the caller ID is detected by the caller ID detection unit; and the data processing device which has a main control unit for retrieving caller profile from a database in response to the caller ID detected by the caller ID detection unit, and for transmitting a voice signal indicating the caller profile to the telephone set through the second line.

The above-mentioned objects of the present invention are achieved by a communication support system which is adapted to connect a telephone device through a communication control device to a data processing device and adapted to connect a telephone network to the communication control device, the communication support system comprising: the communication control device which has a voice signal path and a control signal path from the telephone device, a voice signal path and a state data path from the telephone network, and a display data path from the data processing device; a first multiplexer which has inputs connected to the display data path from the data processing device and the voice signal path from the telephone network and has an output connected to the telephone device via an interface, the first multiplexer transmitting a multiplexed signal, including display data from the data processing device and a voice signal from the telephone network, to the telephone device; and the telephone device which has a display and a demultiplexer having an input connected to the first multiplexer via the interface and having an output connected to the display, wherein the demultiplexer separates the multiplexed signal from the first multiplexer into the display data and the voice signal, the display data being transmitted to the display so that the display data is displayed on the telephone device.

The above-mentioned objects of the present invention are achieved by a communication control device adapted to connect a telephone device and a data processing device through the communication control device and adapted to connect a telephone network to the communication control device, comprising: a voice signal path and a control signal path from the telephone device; a voice signal path and a state data path from the telephone network; a display data path from the data processing device; and a first multiplexer which has inputs connected to the display data path from the data processing device and the voice signal path from the telephone network and has an output connected to the telephone device via an interface, the first multiplexer transmitting a multiplexed signal, including display data from the data processing device and a voice signal from the telephone network, to the telephone device, wherein the telephone device comprises a display and a demultiplexer having an input connected to the first multiplexer via the interface and having an output connected to the display, and the demultiplexer separates the multiplexed signal from the first multiplexer into the display data and the voice signal, the display data being transmitted to the display so that the display data is displayed on the telephone device.

The above-mentioned objects of the present invention are achieved by a method of executing a telephone service processing in a communication support system adapted to connect a telephone set through a communication control device to a data processing device and adapted to connect a telephone network to the communication control device, the method comprising the steps of: detecting a caller ID sent from the telephone network upon incoming of a call; switching off a first line between a voice signal path from the telephone set and a voice signal path from the telephone network and switching on a second line between the voice signal path from the telephone set and a voice signal path from the data processing device after the caller ID is detected; retrieving caller profile from a database of the data processing device in response to the caller ID; transmitting a voice signal indicating the caller profile to the telephone set through the second line; and switching on the first line before a connection between the telephone set and the telephone network is established.

The above-mentioned objects of the present invention are achieved by a method of executing a telephone service processing in a communication support system adapted to connect a telephone device through a communication control device to a data processing device and adapted to connect a telephone network to the communication control device, the method comprising the steps of: receiving display data from the data processing device and a voice signal from the telephone network by the communication control device upon incoming of a call, the display data including caller profile retrieved by the data processing device in response to a caller ID sent from the telephone network; transmitting a multiplexed signal, including the display data and the voice signal, to the telephone device; separating the multiplexed signal into the display data and the voice signal by the telephone device; and transmitting the display data to a display of the telephone device so that the display data is displayed on the telephone device.

In the communication support system of the present invention, it is possible for the telephone user to know the caller profile from the data processing device by the synthesized voice signal on the telephone set upon incoming of a call. It is not necessary for the user to go nearby the monitor of the data processing device when the user issues a call accepting command. The communication support system allows the telephone user to more easily transmit data to or retrieve data from other communication media such as the data processing device.

In the communication support system of the present invention, the telephone device may include a display, and it is possible for the telephone user to know the caller profile from the data processing device which is displayed on the display of the telephone device upon incoming of a call. It is not necessary for the user to go nearby the monitor of the data processing device when the user issues a call accepting command. The communication support system allows the telephone user to more easily transmit data to or retrieve data from other communication media such as the data processing device.

Further, the communication support system of the present invention allows the telephone user to use a cordless telephone to remotely control the data processing device using a control signal sent by the cordless telephone. It is not necessary that the user goes nearby the monitor of the data processing device when remotely controlling the data processing device to obtain a telephone service therefrom.

BRIEF DESCRIPTION OF THE DRAWINGS

The above and other objects, features and advantages of the present invention will be more apparent from the following detailed description when read in conjunction with the accompanying drawings in which:

FIG. 28A and FIG. 28B are diagrams for explaining an example of display data on a telephone device of the communication support system of FIG. 6;

FIG. 29A and FIG. 29B are diagrams for explaining another example of display data on the telephone device of the communication support system of FIG. 6;

DETAILED DESCRIPTION OF THE PREFERRED EMBODIMENTS

A description will now be given of the preferred embodiments of the communication support system of the present invention with reference to the accompanying drawings.

Figure 1:
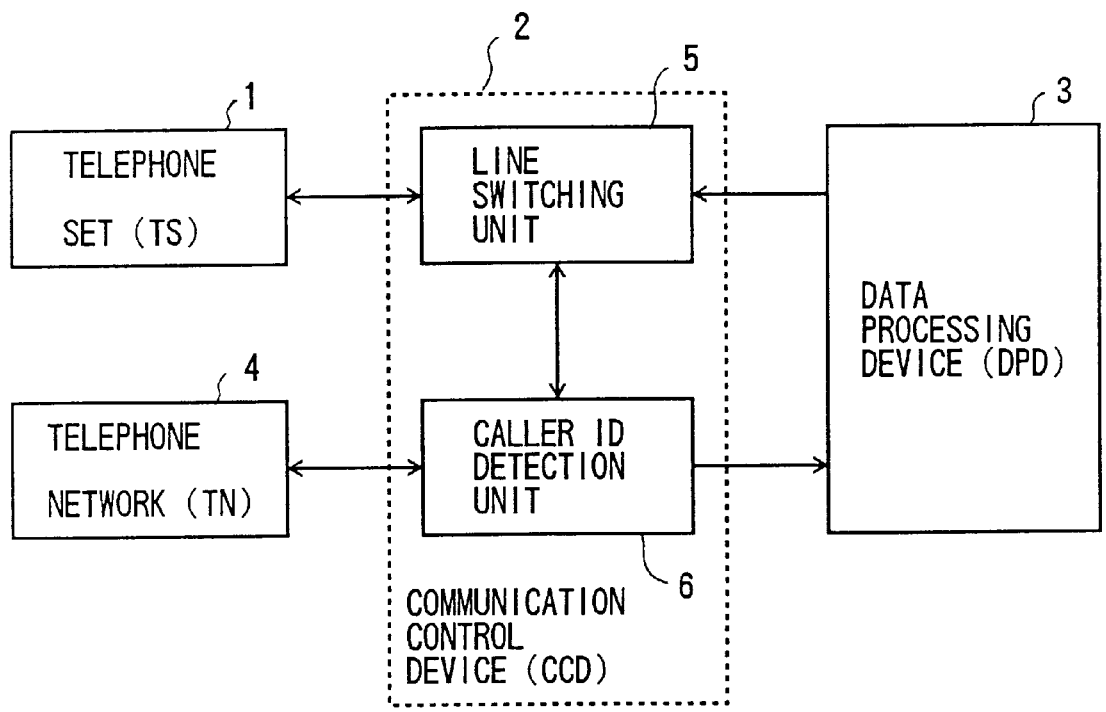
FIG. 1 is a block diagram of basic elements of a communication support system of the present invention in which an incoming call and a caller ID are received.

FIG. 1 shows basic elements of a communication support system of the present invention in which an incoming call and a caller ID are received.

As shown in FIG. 1, the communication support system generally has a telephone set (TS) 1, a communication control device (CCD) 2, a data processing device (DPD) 3, and a telephone network (TN) 4. The telephone set 1 is connected through the communication control device 2 into the data processing device 3, and the communication control device 2 is connected to the telephone network 4.

The telephone set 1 provides existing voice transmission and reception functions and an existing dialing function. The telephone set 1 may include a radio circuit and a cordless telephone. The telephone network 4 is, for example, a public switched telephone network. The data processing device 3 is, for example, a personal computer.

The communication control device (CCD) 2 comprises a line switching unit 5 and a caller ID detection unit 6. The communication control device (CCD) 2 provides connection of the telephone set 1 to the telephone network 4 and connection of the data processing device 3 to the telephone network 4.

In the CCD 2, a first line between a voice signal path from the telephone set 1 and a voice signal path from the telephone network 4, and a second line between the voice signal path from the telephone set 1 and a voice signal path from the data processing device 3 are provided. The caller ID detection unit 6 detects a caller ID (or a caller telephone number) sent from the telephone network 4 upon incoming of a call. The line switching unit 5 switches on the first line before the connection between the telephone set 1 and the telephone network 4 is established. The line switching unit 5 switches off the first line and switches on the second line after the caller ID is detected by the caller ID detection unit 6.

The data processing device (DPD) 3 retrieves a caller profile from a database in response to the caller ID detected by the caller ID detection unit 6. In the database of the DPD 3, a plurality of caller profiles with respect to a plurality of caller IDs are stored in advance. The caller profile (for example, a caller name) with respect to the caller ID from the caller ID detection unit 6 is retrieved from the database by the DPD 3. The data processing device 3 sends a synthesized voice signal indicating the caller profile to the telephone set 1 through the second line of the CCD 2.

Accordingly, in the communication support system of FIG. 1, it is possible for a user of the telephone set 1 to know the caller profile from the data processing device 3 by the synthesized voice on the telephone set 1 upon incoming of a call. It is not necessary for the user to go nearby a monitor of the data processing device 3 when the user issues a call accepting command. The communication support system allows the telephone user to easily transmit a command to or retrieve data from other communication media such as the data processing device 3.

Figure 2:
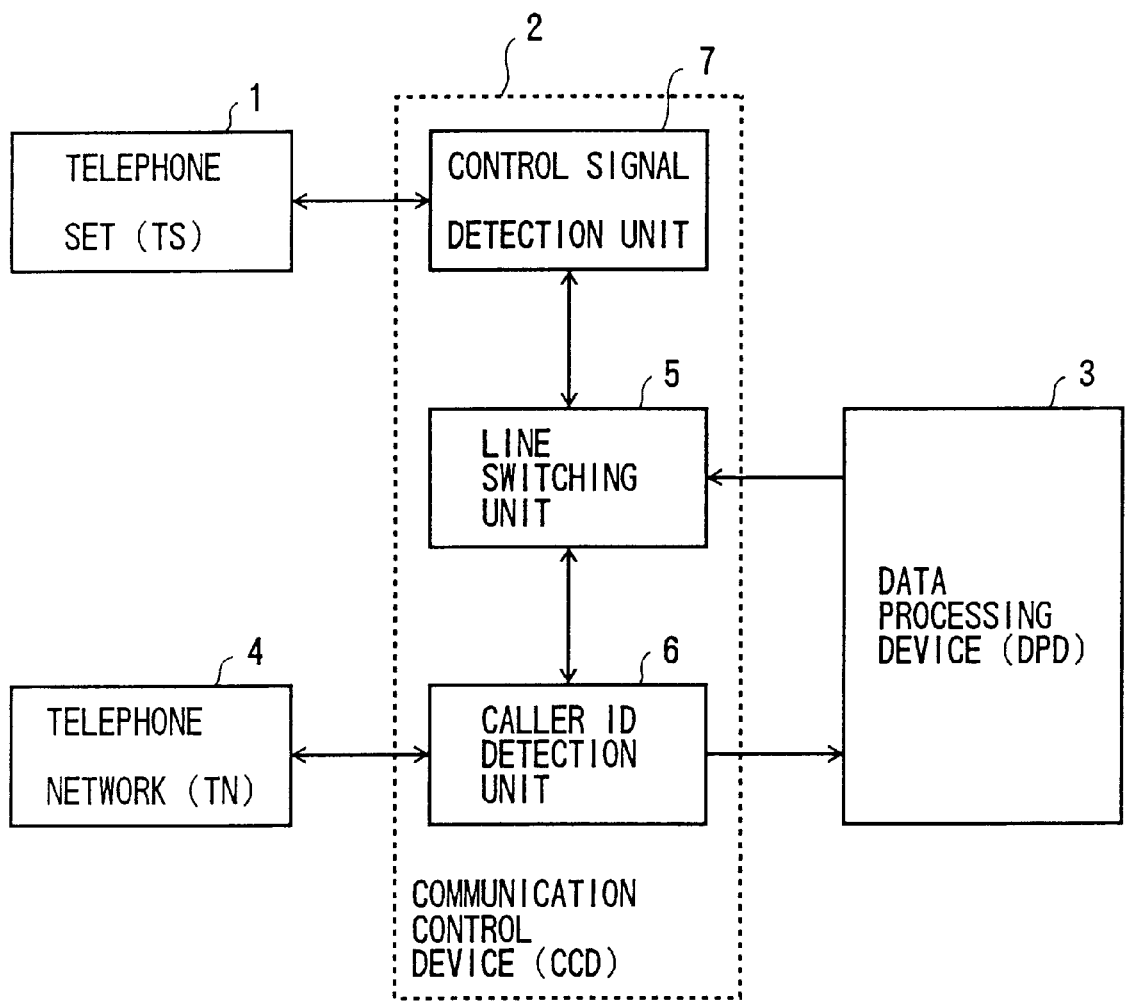
FIG. 2 is a block diagram of basic elements of the communication support system of the present invention in which a call accepting command is sent after the caller profile is confirmed.

FIG. 2 shows basic elements of the communication support system of the present invention in which a call accepting command is sent after the caller profile is confirmed. In FIG. 2, the elements which are the same as corresponding elements in FIG. 1 are designated by the same reference numerals, and a description thereof will be omitted.

As shown in FIG. 2, the communication support system generally has the telephone set (TS) 1, the communication control device (CCD) 2, the data processing device (DPD) 3, and the telephone network (TN) 4. The telephone set 1 is connected through the communication control device 2 into the data processing device 3, and the communication control device 2 is connected to the telephone network 4.

In the CCD 2, the first line between the voice signal path from the telephone set 1 and the voice signal path from the telephone network 4, and the second line between the voice signal path from the telephone set 1 and the voice signal path from the data processing device 3 are provided. The caller ID detection unit 6 detects a caller ID sent from the telephone network 4 upon incoming of a call. The line switching unit 5 switches on the first line before the connection between the telephone set 1 and the telephone network 4 is established. The line switching unit 5 switches off the first line and switches on the second line after the caller ID is detected by the caller ID detection unit 6.

In the communication support system of FIG. 2, the communication control device (CCD) 2 further includes a control signal detection unit 7. The control signal detection unit 7 detects a control signal (for example, a DTMF signal) sent by the telephone set 1. The line switching unit 5 switches on and off a connection line between the voice signal path from the telephone set 1 and the voice signal path from the telephone network 4. In this communication support system, the connection between the telephone set 1 and the telephone network 4 through the connection line is established after the control signal is detected by the control signal detection unit 7 and the connection line is switched on by the line switching unit 5 in response to the control signal.

Accordingly, in the communication support system of FIG. 2, it is possible for the telephone user to know the caller profile from the data processing device 3 on the telephone set 1 by the synthesized voice upon incoming of a call. It is not necessary for the user to go nearby a monitor of the data processing device 3 when the user issues a call accepting command. Further, when the user issues a call accepting command, the user can remotely control the data processing device 3 by transmitting a control signal to the data processing device 3. The communication support system allows the user to easily transmit a command to or retrieve data from other communication media such as a personal computer.

Figure 3:
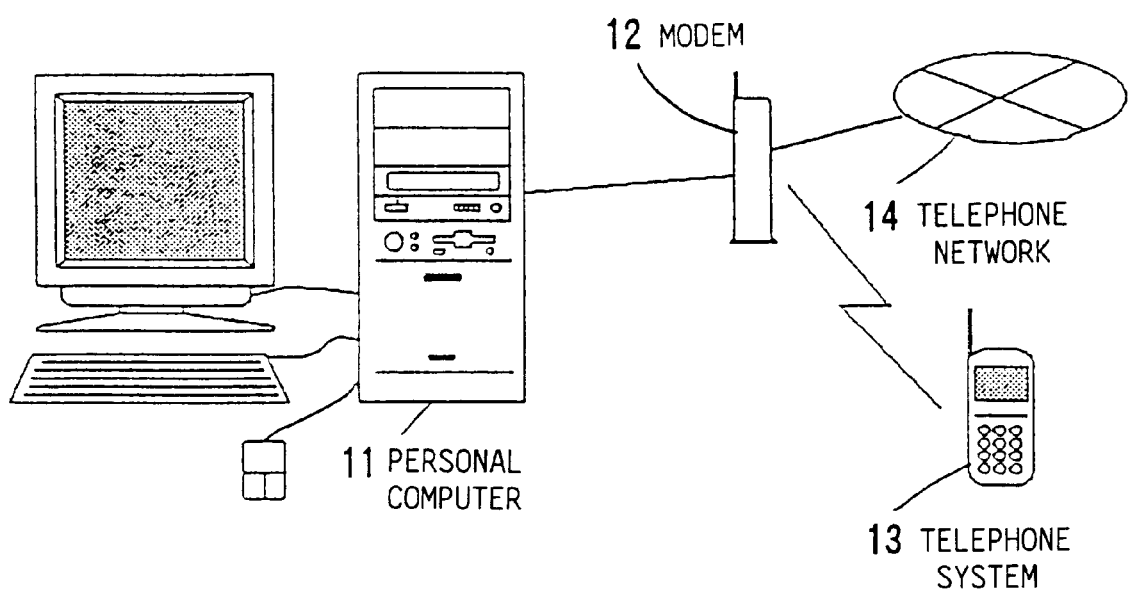
FIG. 3 is a diagram for explaining a configuration of the elements of the communication support system.

FIG. 3 shows a configuration of the elements of the communication support system of the present invention. In the communication support system of FIG. 3, a personal computer 11, a modem 12 and a telephone system 13 are provided as the data processing device (DPD), the communication control device (CCD) and the telephone set (TS), respectively. The telephone system 13 may have a built-in display. Alternatively, the telephone system 13 may include a radio circuit and a cordless telephone. The telephone network 14 is, for example, a public switched telephone network.

Figure 4:
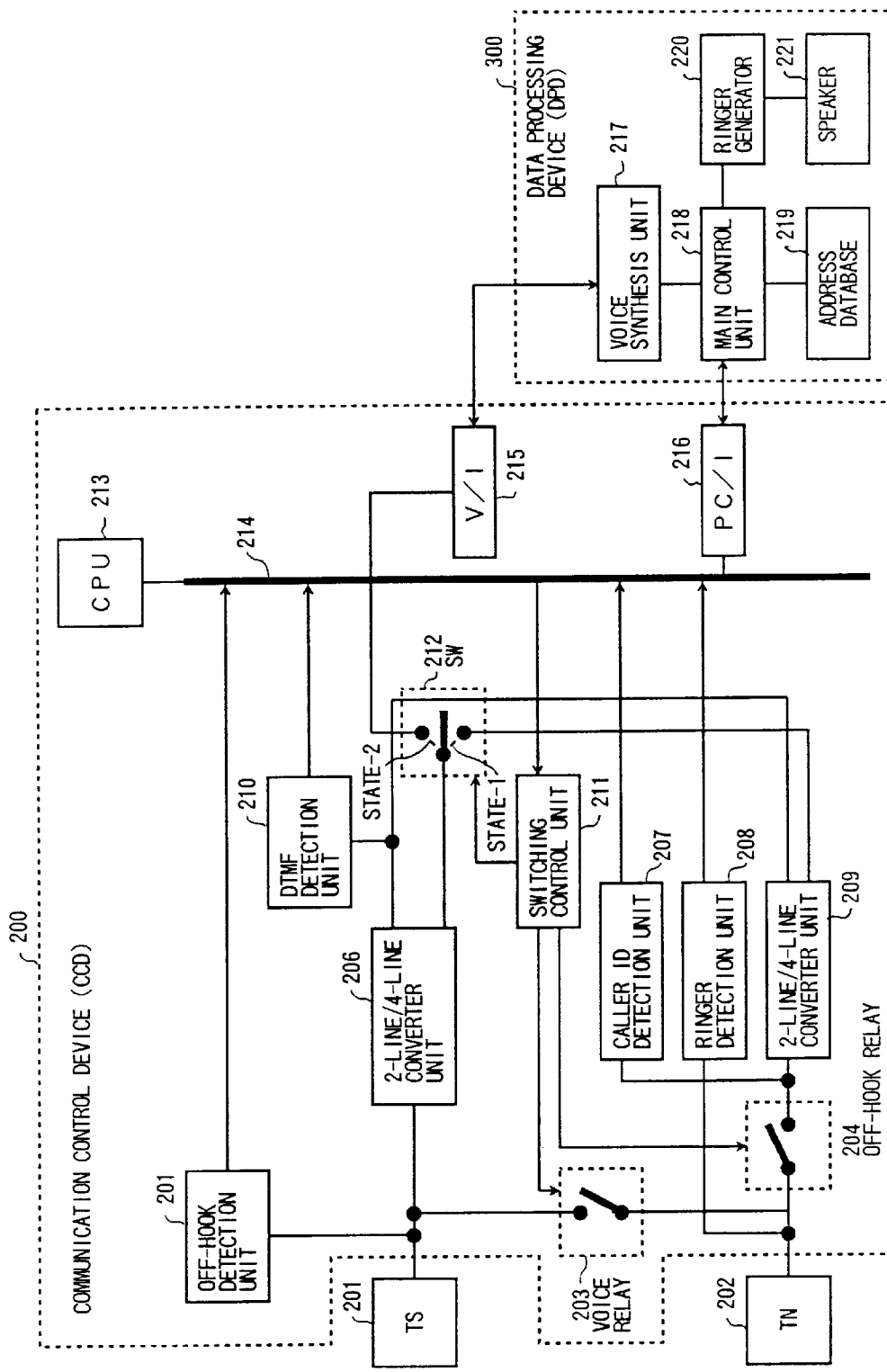
FIG. 4 is a block diagram of a first embodiment of the communication support system of the present invention.

FIG. 4 shows a first embodiment of the communication support system of the present invention.

In the communication support system of the present embodiment, when a call from the TN is incoming, the DPD sends a synthesized voice signal indicating a caller ID (telephone number) or a caller profile (caller name) through the CCD to the TS. As the caller ID or the caller profile is vocalized by the TS, the user of the TS can know the caller ID (the telephone number) or the caller profile (the caller name) through the TS by voice. After the caller profile is confirmed, the user of the TS transmits a DTMF (dual-tone multiple frequency) signal through the CCD to the DPD as a call accepting command. The DPD issues a line switching command to the CCD in response to the DTMF signal, so that a switching of the CCD is performed based on the line switching command to connect the TN and the TS through the CCD to establish the connection between the TS and the TN. The telephone user can communicate with the caller through the TN by voice.

As shown in FIG. 4, the communication support system is adapted to connect a telephone set (TS) 201 through a communication control device (CCD) 200 to a data processing device (DPD) 300, and adapted to connect a telephone network (TN) 202 to the communication control device (CCD) 200.

In the CCD 200 of the present embodiment, a voice relay 203, an off-hook relay 204, an off-hook detection unit 205, a 2-line/4-line converter unit 206, a caller ID detection unit 207, a ringer detection unit 208, a 2-line/4-line converter unit 209, a DTMF detection unit 210, a switching control unit 211, a switch (SW) 212, a central processing unit (CPU) 213, a system bus 214, a voice interface (V/I) unit 215, and a personal-computer interface (PC/I) unit 216 are provided. In the DPD 300 of the present embodiment, a voice synthesis unit 217, a main control unit 218, an address database 219, a ringer generator 220, and a speaker 221 are provided.

In the communication support system of FIG. 4, the TS 201 provides the existing voice signal transmission and receiving functions and the existing dialing function. The TS 201 may include a radio circuit and a cordless telephone. The TN 202 is, for example, a public switched telephone network.

In the CCD 200 of the present embodiment, the CPU 213 receives signals from the elements of the CCD 200 connected through the system bus 214, and controls the elements of the CCD 200.

The voice relay 203 switches on or off a connection line between the TS 201 and the TN 202. When the voice relay 203 switches on the connection line between the TS 201 and the TN 202, a connection between the TS 201 and the TN 202 can be established. The off-hook relay 204 switches on or off a connection line between the TN 202 and the CCD 200. When a call from the TN 202 is incoming, the off-hook relay 204 switches on the connection line between the TN 202 and the CCD 200 in order to detect a caller ID from the telephone line. The off-hook detection unit 205 provides a detecting function of a called state of the TS 201.

The 2-line/4-line converter unit 206 separates voice data from the TS 201 into a DTMF signal and a synthesized voice signal. The converter unit 206 has a DTMF signal path and a voice signal path which are connected to outputs of the converter unit 206. Similarly, the 2-line/4-line converter unit 209 separates voice data from the TN 202 into a DTMF signal and a synthesized voice signal. The converter unit 209 has a DTMF signal path and a voice signal path which are connected to outputs of the converter unit 209. The caller ID detection unit 207 provides a detecting function of a caller ID from the TN 202 when the off-hook relay 204 is set in the on-state to connect the TN 202 and the CCD 200.

The ringer detection unit 208 provides a detecting function of an incoming call from the TN 202. The DTMF detection unit 210 provides a detecting function of a DTMF signal sent by the TS 201. The switching control unit 211 performs switching of the voice relay 203, the off-hook relay 204 and the switch 212 under control of the CPU 213.

The switch (SW) 212 is set in a "state-1" by the switching control unit 211 such that the switch 212 switches on a connection line between the voice signal path from the converter unit 206 and the voice signal path from the converter unit 209 in order to perform a communication between the TS 201 and the TN 202 by voice. Also, the switch (SW) 212 is set in a "state-2" by the switching control unit 211 such that the switch 212 switches on a connection line between the voice signal path from the converter unit 206 and a voice signal path from the DPD 300 via the voice interface unit 215 in order for the DPD 300 to communicate with the TS 201 by voice. The voice interface unit 215 provides a voice signal interface between the CCD 200 and the DPD 300. The PC interface unit 216 provides a data interface between the CCD 200 and the DPD 300.

In the DPD 300, the voice synthesis unit 217 generates a synthesized voice signal indicating a caller profile so that the synthesized voice signal (the caller profile) is sent from the DPD 300 to the TS 201 through the CCD 200. Alternatively, the voice synthesis unit 217 generates a synthesized voice signal indicating the caller ID (or the telephone number) so that the synthesized voice signal (the caller ID) is sent from the DPD 300 to the TS 201 through the CCD 200. In the address database 219, a plurality of caller profiles with respect to a plurality of caller IDs are stored. The caller profile with respect to the caller ID sent from the TN 202 is retrieved from the address database 219 by the main control unit 218, and the caller profile is supplied to the voice synthesis unit 217 by the main control unit 218.

The ringer generator 220 generates a ringing signal under control of the main control unit 218. The speaker 221 outputs a ringing sound in response to the ringing signal output from the ringer generator 220. When the DPD 300 is notified that an incoming call and a caller ID from the TN 202 are received, the main control unit 218 controls the ringer generator 220 so that the ringer generator 220 generates a ringing signal and outputs the ringing signal to the speaker 221. The main control unit 218. retrieves a corresponding caller profile from the address database 219 based on the caller ID from the TN 202. The main control unit 218 supplies the caller profile from the address database 219 to the voice synthesis unit 217 so that the voice synthesis unit 217 generates a synthesized voice signal indicating the caller profile. The synthesized voice signal is sent from the DPD 300 to the TS 201 through the CCD 200.

In the DPD 300 of the present embodiment, a caller ID service processing program related to the flowchart of FIG. 5 (which will be described later) is program code instructions stored in a memory (not shown) of the main control unit 218. The memory of the main control unit 218 is, for example, a ROM (read-only memory). The memory corresponds to a computer readable medium in the claims. The computer readable medium includes any one of instruction storage devices, such as, for example, magnetic disks including floppy disks, optical disks including CD-ROMs, magneto-optical disks including MOs, semiconductor memory cards, such as PC cards and miniature cards, and other types of computer usable devices and media.

Further, in the present embodiment, the memory of the main control unit 218 may store encoded or non-encoded instructions. The instructions may be installed from a floppy disk (or a CD-ROM) to a hard disk drive (not shown) of the DPD 300 first, transferred to a RAM (not shown) of the DPD 300 and then read by the main control unit 218. The memory of the DPD 300 may store either all or a part of the instructions related to the flowchart of FIG. 5.

Further, in the present embodiment, the main control unit 218 issues a command to the CPU 213 via the PC interface 216 and the system bus 214. The PC interface 216 provides a command interface between the main control unit 218 and the CPU 213. Taking into consideration the command interface between the main control unit 218 and the CPU 213, a part of the program code instructions of the caller ID service processing program related to the flowchart of FIG. 5 may be stored in a memory (not shown) of the CPU 213 of the CCD 200, and the remainder of the program code instructions may be stored in the memory of the main control unit 218 of the DPD 300.

In the above-described embodiment, a DTMF signal is used by the TS 201 to issue a command to the CCD 200. Alternatively, a dial-pulse signal may be used by the TS 201 to issue a command to the CCD 200. In such a case, the DTMF detection unit 210 in the communication support system of FIG. 4 may be substituted for by a dial-pulse detection unit to carry out the same function. Further, a frequency-based signal may be used by the TS 201 to issue a command to the CCD 200. In such a case, the DTMF detection unit 210 in the communication support system of FIG. 4 may be substituted for by a specified frequency detection unit to carry out the same function.

Figure 5:
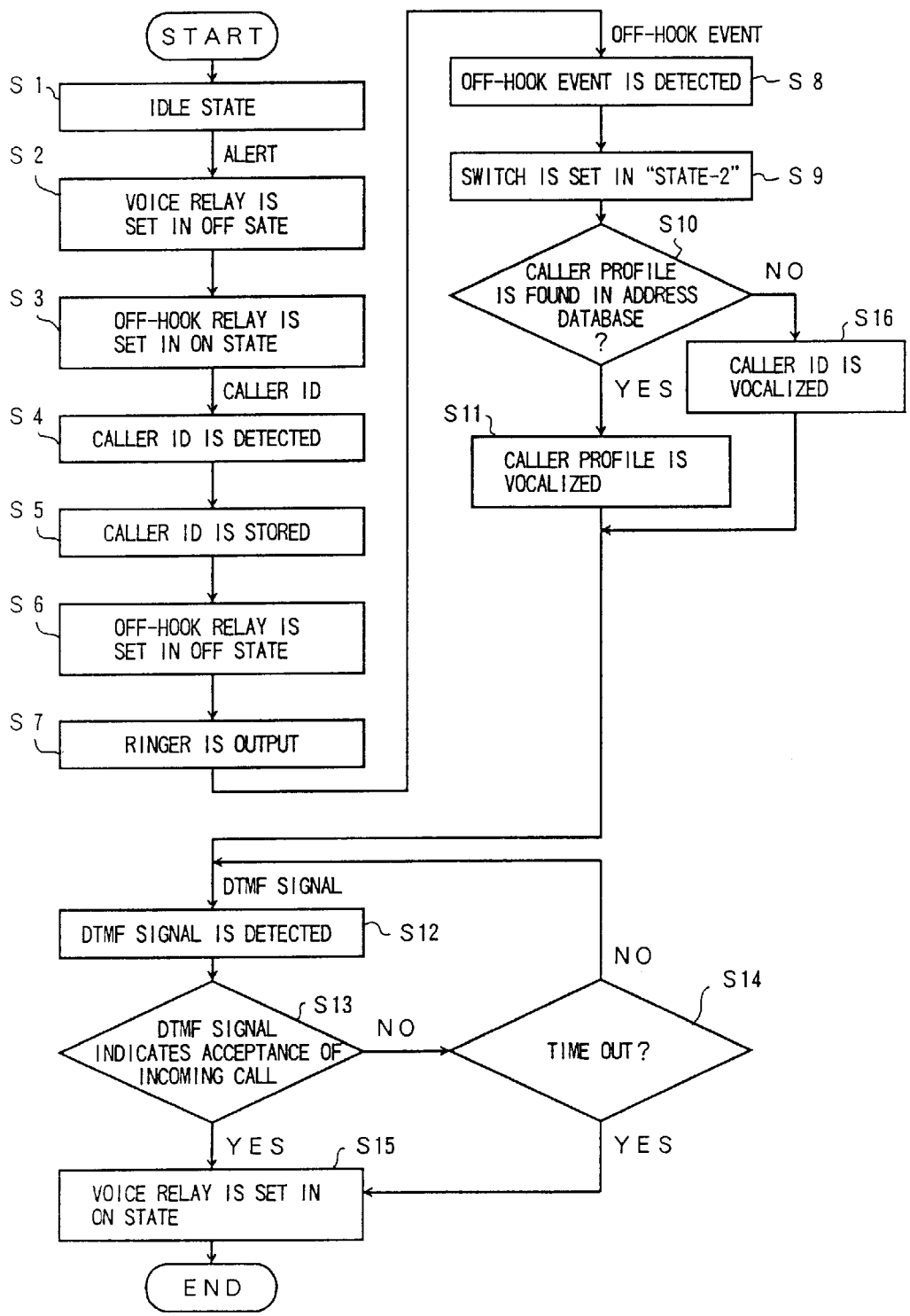
FIG. 5 is a flowchart for explaining a caller ID service processing performed by the communication support system of FIG. 4.

FIG. 5 shows a caller ID service processing performed by the communication support system of FIG. 4.

As shown in FIG. 5, at the start of the caller ID service processing, the program code instructions cause the CPU 213 to be placed in an idle state (S1). During the idle state, the CPU 213 waits for any event, for example, an incoming call from the TN 202. When a call from the TN 202 is incoming, the ringer detection unit 208 detects the incoming of the call from the TN 202 and notifies the CPU 213 of the reception of the call.

When the reception of the call is notified to the CPU 213, the program code instructions cause the CPU 213 to control the switching control unit 211 so as to set the voice relay 203 in the off state which switches off the connection line between the TS 201 and the TN 202 (S2). The program code instructions cause the CPU 213 to control the switching control unit 211 so as to set the off-hook relay 204 in the on state which switches on the connection line between the TN 202 and the CCD 200 (S3). Since the off-hook relay 204 is set in the on-state at this time, the caller ID detection unit 207 is ready to detect a caller ID sent from the TN 202.

The program code instructions cause the CPU 213 to control the caller ID detection unit 207 such that the caller ID detection unit 207 detects the caller ID sent from the TN 202 (S4) In the CCD 200, the program code instructions cause the CPU 213 to temporarily store the caller ID in the memory of the CCD 200 (S5). The CPU 213 notifies the caller ID (detected by the caller ID detection unit 207) to the DPD 300 via the PC interface unit 216.

In the DPD 300, the program code instructions cause the main control unit 218 to send a reception notification for the detection of the caller ID to the CPU 213 via the PC interface unit 216.

When the notification from the DPD 300 is received, the program code instructions cause the CPU 213 to control the switching control unit 211 so as to perform the switching of the off-hook relay 204. The off-hook relay 204 switches off the connection line between the TN 202 and the CCD 200 (S6).

In the DPD 300, the program code instructions cause the main control unit 218 to control the ringer generator 220 so that the ringer generator 220 generates a ringing signal and outputs the ringing signal to the speaker 221. The speaker 221 outputs a ringing sound in response to the ringing signal from the ringer generator 220 (S7).

When the above S7 is performed, the user of the TS 201 picks up the handset of the TS 201 so that the TS 201 is set in the called state. The program code instructions cause the CPU 213 to control the off-hook detection unit 205 so as to detect the off-hook event of the TS 201 (S8). The CPU 213 notifies the DPD 300 via the PC interface unit 216 that the TS 201 is set in the called state.

After the notification of the off-hook event of the TS 201, in the DPD 300, the program code instructions cause the main control unit 218 to issue a line switching command to the CPU 213 via the PC interface unit 216.

When the line switching command from the DPD 300 is received, the program code instructions cause the CPU 213 to control the switching control unit 211 based on the line switching command (S9). The switching control unit 211 sets the switch 212 in the "state-2" such that the switch 212 switches on the connection line between the voice signal path of the converter unit 206 and the voice signal path of the voice interface. Unit 215 in order for the TS 201 to receive a synthesized voice signal from the DPD 300.

After the setting of the switching control unit 211 of the above S9 is performed, in the DPD 300, the program code instructions cause the main control unit 218 to determine whether a corresponding caller profile for the caller ID (stored in the above S5) is found in the address database 219 (S10).

When the result of the above S10 is negative, it is determined that the caller profile for the caller ID is not included in the address database 219. The program code instructions cause the main control unit 218 to send the caller ID (or the telephone number) to the voice synthesis unit 217 (S16). The voice synthesis unit 217 generates a synthesized voice signal indicating the caller ID, and the voice signal is sent to the TS 201 through the CCD 200. In the TS 201, the caller ID (or the telephone number) is vocalized based on the synthesized voice signal sent from the DPD 300 (S16). The user of the TS 201 can know who the caller is at this time by voice. The communication support system goes to the idle state in which a reply of the user of the TS 201 to the caller ID notification is awaited.

When the result of the above S10 is affirmative, it is determined that the caller profile for the caller ID is found in the address database 219. The program code instructions cause the main control unit 218 to send the caller profile (retrieved from the address database 219) to the voice synthesis unit 217 (S11). The voice synthesis unit 217 generates a synthesized voice signal indicating the caller profile, and the voice signal is sent to the TS 201 through the CCD 200. In the TS 201, the caller profile (or the caller name) is vocalized based on the synthesized voice signal from the DPD 300 (S11). The user of the TS 201 can know who the caller is at this time by voice. The communication support system goes to the idle state in which a reply of the user of the TS 201 to the caller profile notification is awaited.

After the above S11 or the above S16 is performed, the user of the TS 201 transmits a DTMF signal to the DPD 300 through the CCD 200 as a call accepting command. Normally, the DTMF signal indicates a control command for acceptance of the incoming call, and the DTMF signal is transmitted from the TS 201 to the DPD 300 through the CCD 200.

In the CCD 200, the program code instructions cause the CPU 213 to control the DTMF detection unit 210 so that the DTMF detection unit 210 detects the DTMF signal sent by the TS 201 (S12). The CPU 213 notifies the DPD 300 via the PC interface unit 216 that the DTMF signal is detected by the DTMF detection unit 210.

In the DPD 300, the program code instructions cause the main control unit 218 to determine whether the DTMF signal (determined by the DTMF detection unit 210) indicates acceptance of the incoming call (S13).

When the result of the above S13 is negative, the program code instructions cause the main control unit 218 to be set in the DTMF signal waiting state. The program code instructions cause the main control unit 218 to determine whether the DPD 300 is notified of the detection of a next DTMF signal from the TS 201 within a given period of time (S14).

When the result of the above S14 is negative, the control is transferred to the above S12. On the other hand, when the result of the above S14 is affirmative, the program code instructions cause the main control unit 218 to send a line switching command to the CCD 200 via the PC interface unit 216 (S15). In the CCD 200, the program code instructions cause the CPU 213 to control the switching control unit 211 based on the line switching command. The switching control unit 211 sets the voice relay 203 in the on-state (S15). Since the voice relay 203 switches on the connection line between the TS 201 and the TN 202, the connection between the TS 201 and the TN 202 can be performed.

On the other hand, when the result of the above S13 is affirmative, the program code instructions cause the main control unit 218 to send a line switching command to the CCD 200 via the PC interface unit 216 (S15). In the CCD 200, the CPU 213 controls the switching control unit 211 based on the line switching command. The switching control unit 211 sets the voice relay 203 in the on-state (S15). Since the voice relay 203 switches on the connection line between the TS 201 and the TN 202, the connection between the TS 201 and the TN 202 can be performed.

Accordingly, in the communication support system of the present embodiment, when a call from the TN 202 is incoming, the DPD 300 transmits the caller profile to the TS 201. The user of the TS 201 can know the caller profile on the TS 201 by voice. After the caller profile is confirmed, the user of the TS 201 transmits a DTMF signal through the CCD 200 to the DPD 300 as a call accepting command. The DPD 300 sends a line switching command to the CCD 200 so that a switching of the voice relay 203 is performed based on the line switching command to connect the TN 202 and the TS 201 through the CCD 200 to establish the connection between the TS 201 and the TN 202. The telephone user can communicate with the caller in the TN 202 by voice.

In the above-described embodiment, the DTMF signal is used by the TS 201 to issue the call accepting command. Alternatively, a dial-pulse signal, a hooking signal or another signal may be used by the TS 201 to issue the call accepting command.

In the above-described embodiment, the main control unit 218 in the above S15 sends the line switching command to the CCD 200 via the PC interface unit 216, and in the CCD 200, the CPU 213 controls the switching control unit 211 based on the line switching command so as to set the voice relay 203 in the on-state. In a case in which the main control unit 218 is capable of performing an answering machine function, the setting of the voice relay 203 of the above S15 may be substituted for by the setting of the off-hook relay in the on-state by a line switching command sent from the main control unit 218 so that the answering machine function is performed in the above S15. Further, in a case in which the main control unit 218 is capable of performing a different telephone service, a DTMF signal may be used to carry out the telephone service.

Figure 6:
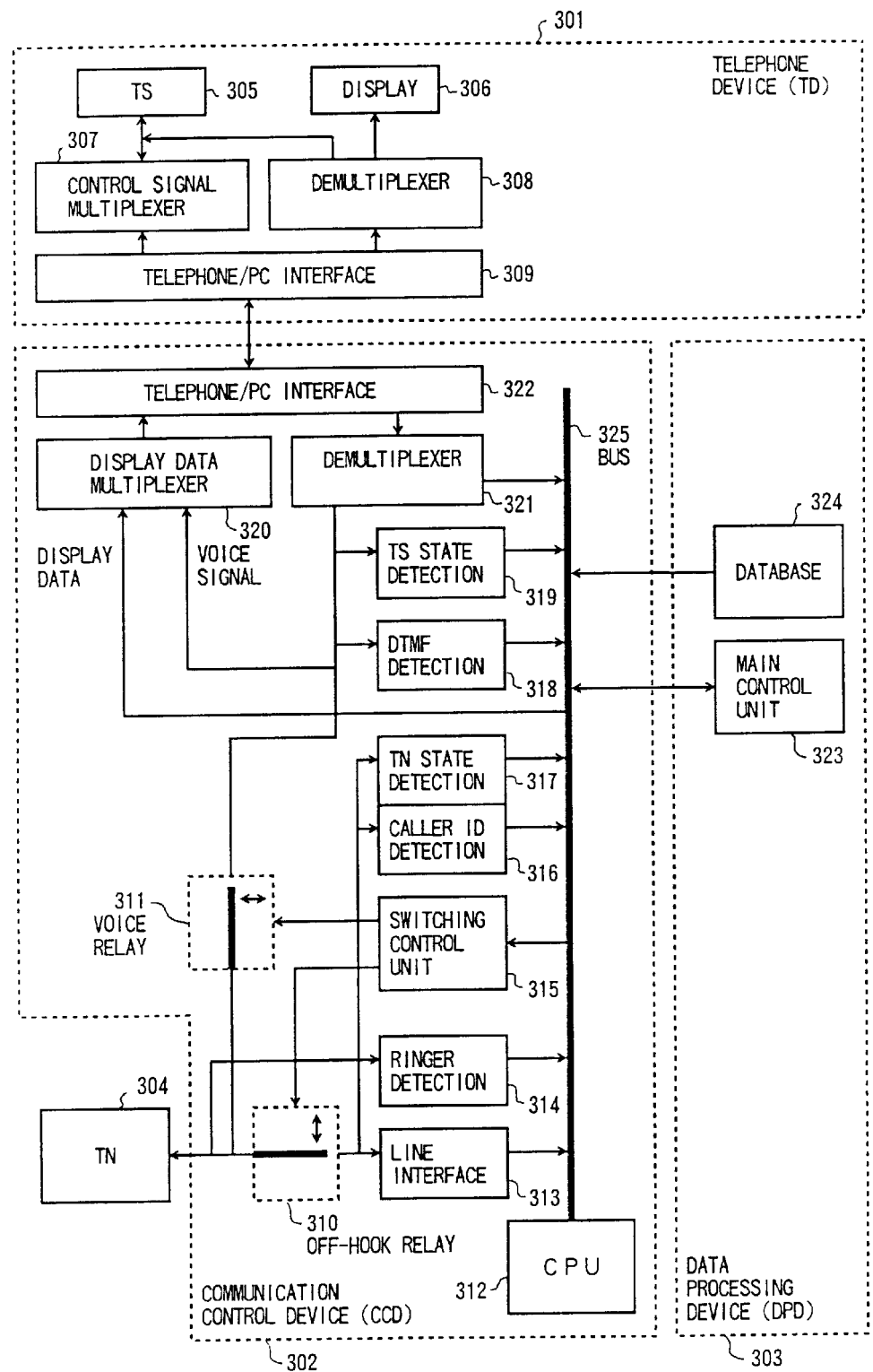
FIG. 6 is a block diagram of a second embodiment of the communication support system of the present invention.

FIG. 6 shows a second embodiment of the communication support system of the present invention.

In the communication support system of the present embodiment, when a call from the TN is incoming, the DPD transmits display data indicating a caller ID (or a caller telephone number) and/or a caller profile (including a caller name and relevant data) through the CCD to a telephone device (TD). As the display data from the DPD is displayed on a display of the TD, the user of the TD can know the caller ID and/or the caller profile on the display with no need to go to the location of the DPD. After the caller profile is confirmed, the user of the TD transmits an actuating signal from the TS through the CCD to the DPD. The DPD transmits a line switching command to the CCD in response to the actuating signal, so that a switching of the CCD is performed based on the line switching command to connect the TN and the TD through the CCD. This allows the connection between the TN and the TD to be established. The user of the TD can communicate with the caller in the TN by voice.

Figure 8:
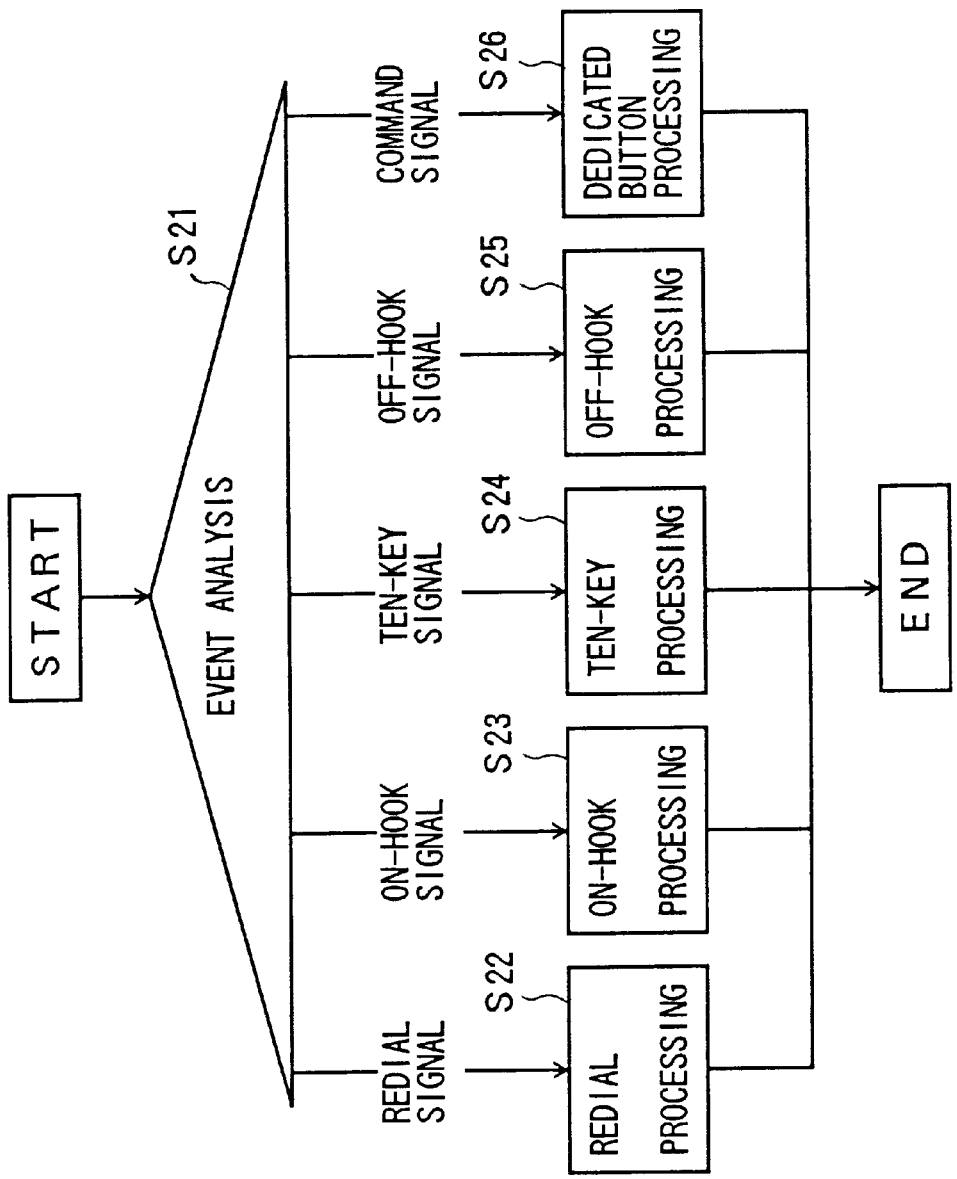
FIG. 8 is a flowchart for explaining a basic processing performed by the communication support system of FIG. 6 in response to an actuating signal sent by a telephone set.

As shown in FIG. 8, the communication support system is adapted to connect a telephone device (TD) 301 through a communication control device (CCD) 302 to a data processing device (DPD) 303, and adapted to connect a telephone network (TN) 304 to the communication control device (CCD) 302.

In the TD 301 of the present embodiment, a telephone set (TS) 305, a display 306, a control signal multiplexer 307, a demultiplexer 308, and a telephone/PC interface 309 are provided.

The TS 305 provides the existing voice signal transmission and receiving functions and the existing dialing function. The TS 305 may includes a radio circuit and a cordless telephone. The TN 304 is, for example, a public switched telephone network.

The display 306 provides monitoring of display data sent from the DPD 303.

The control signal multiplexer 307 generates a multiplexed signal by multiplexing a control signal (for example, a DTMF signal) sent by the TS 305 and a voice signal sent by the TS 305. The multiplexed signal from the control signal multiplexer 307 is transmitted to the CCD 302 through the telephone/PC interface 309.

The demultiplexer 308 separates a multiplexed signal sent from the CCD 302 into a synthesized voice signal and a display data signal. The voice signal from the demultiplexer 308 is transmitted to the TS 305, and the display data signal from the demultiplexer 308 is transmitted to the display 306.

The telephone/PC interface 309 provides a multiplexed signal interface between the TD 301 and the CCD 302.

In the CCD 302 of the present embodiment, an off-hook relay 310, a voice relay 311, a central processing unit (CPU) 312, a line interface 313, a ringer detection unit 314, a switching control unit 315, a caller ID detection unit 316, a TN (telephone network) state detection unit 317, a DTMF detection unit 318, a TS (telephone set) state detection unit 319, a display data multiplexer 320, a demultiplexer 321, a telephone/PC interface 322, and a bus 325.

The off-hook relay 310 switches on or off a connection line between the TN 304 and the CCD 302. When a call from the TN 304 is incoming, the off-hook relay 310 switches on the connection line between the TN 304 and the CCD 302 in order to detect a caller ID from the telephone line. The TS state detection unit 319 provides detection of an off-hook state of the TS 305. The voice relay 311 switches on or off a connection line between the TS 305 and the TN 304. When the voice relay 311 switches on the connection line between the TS 305 and the TN 304, a connection between the TS 305 and the TN 304 can be performed.

The line interface 313 provides an interface between the TN 304 and the bus 325. The ringer detection unit 314 provides detection of incoming of a call sent from the TN 304. The switching control unit 315 performs switching of the voice relay 311 and the off-hook relay 310 under control of the CPU 312.

The caller ID detection unit 316 provides detection of a caller ID from the TN 304 when the off-hook relay 310 is set in the on-state to connect the TN 304 and the CCD 302. The TN state detection unit 317 provides detection of an operating state of the TN 304. The operating state of the TN 304 includes a busy state, a line disconnection state, a line connection state and a call reception state, and a notification of the detection of the operating state of the TN 304 is sent to the CPU 312 from the TN state detection unit 317.

The DTMF detection unit 318 provides detection of a DTMF signal sent by the TS 305. The TS state detection unit 319 provides detection of an operating state of the TS 305 other than the off-hook state, the on-hook state, and the DTMF signal notified to the CCD 302 from the TS 305. The display data multiplexer 320 generates a multiplexed signal by multiplexing a voice signal sent from the TN 304 and display data sent from the DPD 303. The multiplexed signal from the display data multiplexer 320 is transmitted to the TD 301 through the telephone/PC interface 322.

The demultiplexer 321 separates a multiplexed signal sent from the TD 301 into a voice signal (supplied to the TN 304) and a control signal (supplied to the CCD 302 and/or the DPD 303). The telephone/PC interface 322 provides multiplexed signal interface between the CCD 302 and the TD 301.

In the CCD 302 of the present embodiment, the CPU 312 receives signals from the elements of the CCD 302 connected through the bus 325, and controls the elements of the CCD 302.

In the DPD 303 of the present embodiment, a main control unit 323 and a database 324 are provided. In the database 324, a plurality of caller profiles (including caller names and relevant data) with respect to a plurality of caller IDs are stored. When the DPD 303 is notified that an incoming call and a caller ID from the TN 304 are received, a corresponding caller profile with respect to the caller ID from the TN 304 is retrieved from the database 324 by the main control unit 323, and the caller profile is transmitted to the TD 301 through the CCD 302 by the main control unit 323.

In the DPD 303 of the present embodiment, a telephone service processing program related to the flowcharts of FIGS. 8–27 (which will be described later) is program code instructions stored in a memory (not shown) of the main control unit 323. The memory of the main control unit 323 is, for example, a ROM (read-only memory). The memory corresponds to a computer readable medium in the claims. The computer readable medium includes any one of instruction storage devices, such as, for example, magnetic disks including floppy disks, optical disks including CD-ROMs, magneto-optical disks including MOs, semiconductor memory cards, such as PC cards and miniature cards, and other types of computer usable devices and media.

Further, in the present embodiment, the memory of the main control unit 323 may store encoded or non-encoded instructions. The instructions may be installed from a floppy disk (or a CD-ROM) to a hard disk drive (not shown) of the DPD 303 first, transferred to a RAM (not shown) of the DPD 303 and then read by the main control unit 323. The memory of the DPD 303 may store either all or a part of the instructions related to the flowcharts of FIGS. 8–27.

Further, in the present embodiment, the main control unit 323 transmits a command to the CPU 312 via the bus 325. A PC interface (not shown) provides a command interface between the main control unit 323 and the CPU 312. Taking into consideration the command interface between the main control unit 323 and the CPU 312, a part of the program code instructions of the telephone service processing program related to the flowcharts of FIGS. 8–27 may be stored in a memory (not shown) of the CPU 312 of the CCD 302, and the remainder of the program code instructions may be stored in the memory of the main control unit 323 of the DPD 303.

In the above-described embodiment, a DTMF signal is used by the TS 305 to transmit a reception acknowledge signal to the CCD 302. Alternatively, a dial-pulse signal may be used by the TS 305 to transmit the reception acknowledge signal to the CCD 302. In such a case, the DTMF detection unit 318 in the communication support system of FIG. 6 may be substituted for by a dial-pulse detection unit to carry out the same function. Further, a frequency-based signal may be used by the TS 305 to transmit the reception acknowledge signal to the CCD 302. In such a case, the DTMF detection unit 318 in the communication support system of FIG. 6 may be substituted for by a specified frequency detection unit to carry out the same function.

Figure 7:
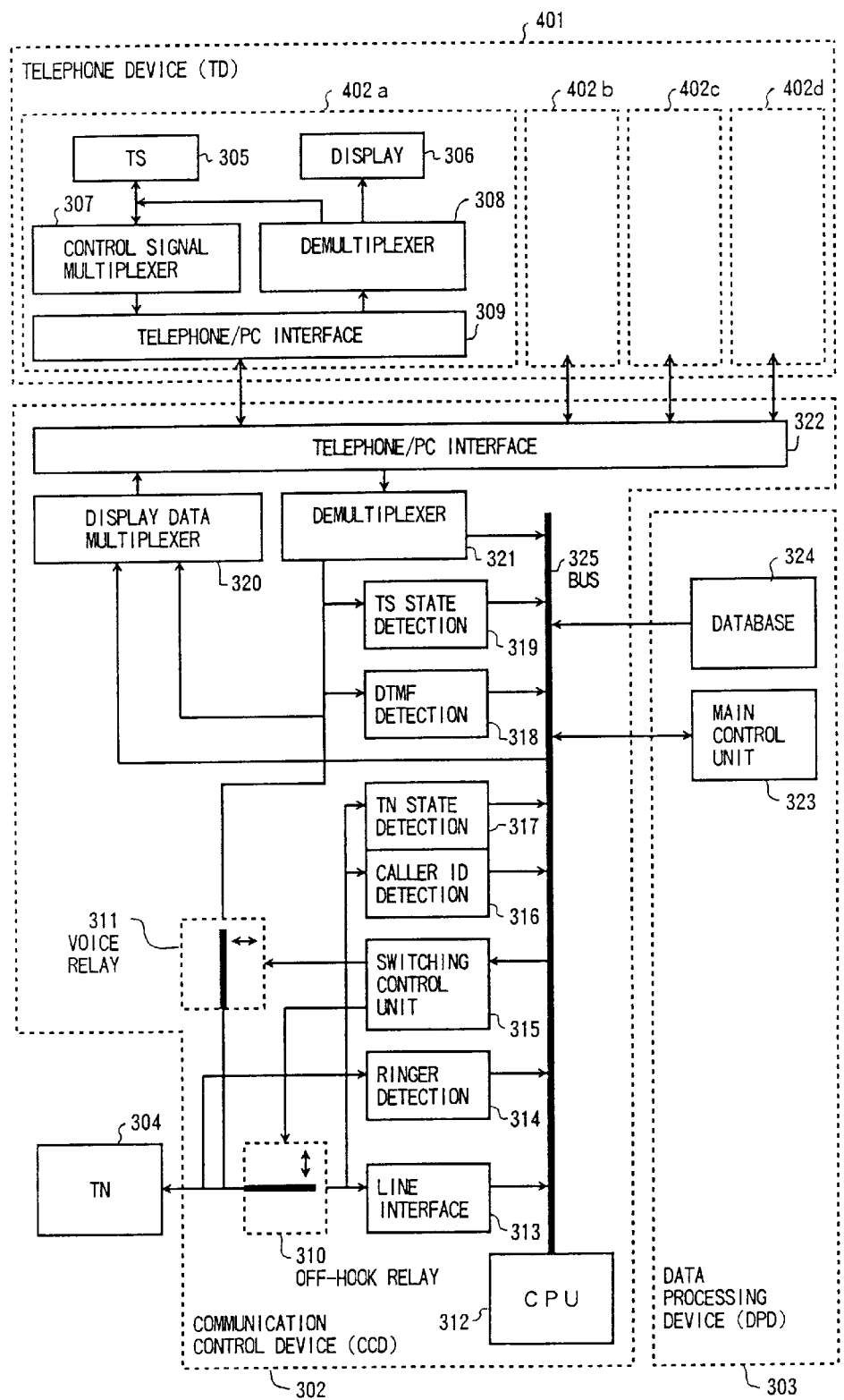
FIG. 7 is a block diagram of a modification of the communication support system of FIG. 6.

FIG. 7 shows a modification of the communication support system of FIG. 6.

In the communication support system of FIG. 7, a telephone device (TD) 401 includes a plurality of portable handsets 402a, 402b, 402c and 402d, and each of the plurality of portable handsets has a construction that is the same as the construction of the telephone device (TD) 301 of FIG. 6. Other elements of the communication support system of FIG. 7 are essentially the same as corresponding elements of the communication support system of FIG. 6, and a description thereof will be omitted.

FIG. 8 shows a basic processing performed by the communication support system of FIG. 6 in response to an actuating signal sent by the TS.

At the start of the processing of FIG. 8, power is supplied to the communication support system of FIG. 6 and the communication support system is placed in an event analysis condition (S21). During the event analysis condition, the communication support system is waiting for a reception of an actuating signal sent by the TS 305, or a telephone call between the TS 305 and the TN 304 is in progress through the communication support system. During the event analysis condition, the CCD 302 is capable of detecting an occurrence of an event due to an actuating signal from the TS 305 by using the DTMF detection unit 318 and the TS state detection unit 319.

When the processing of FIG. 8 is performed by the communication support system, the CCD 302 and the DPD 303 manage a status value of the telephone line between the TN 304 and the TD 301 according to the result of the event analysis of the above S21. In the present embodiment, the status value is defined as follows: status value "0" indicates a vacant state of the telephone line; status value "1" indicates a calling state of the telephone line; status value "2" indicates a busy state of the telephone line; status value "3" indicates a reception state of the telephone line; status value "4" indicates a connection processing state of the telephone line; status value "5" indicates a connection state of the telephone line; and status value "6" indicates a disconnection state of the telephone line.

The status values and the telephone line states mentioned above are given for the sake of convenience of description, and the present invention is not limited to the above-mentioned embodiment.

Figure 9:
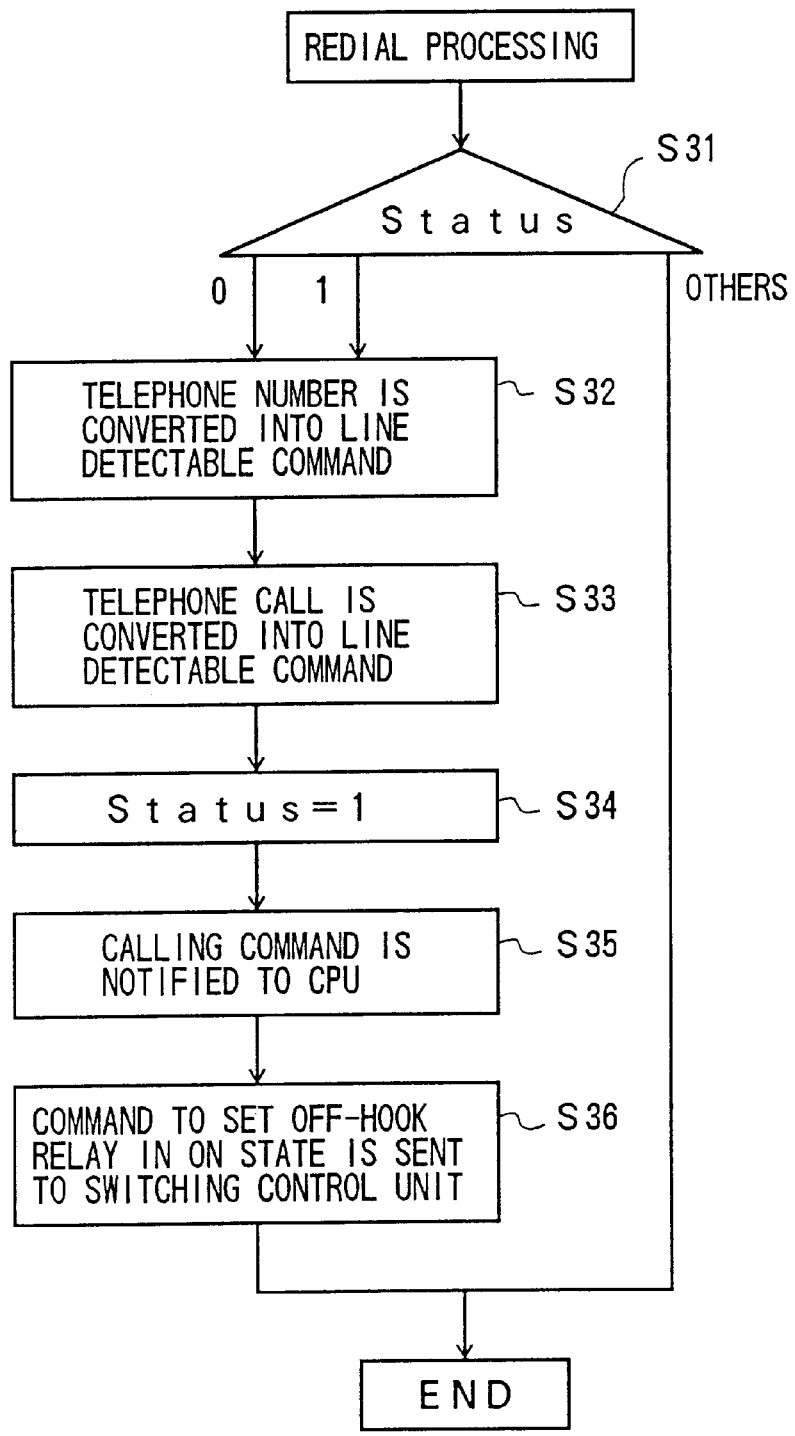
FIG. 9 is a flowchart for explaining a redial processing in the processing of FIG. 8.

When the user of the TD 301 presses a redial button (not shown) of the TS 305 during the event analysis condition of the above S21, a redial signal sent from the TD 301 is detected by the TS state detection unit 319 in the CCD 302. The CPU 312 notifies the main control unit 323 via the bus 325 that the redial signal from the TD 301 is detected. In the DPD 303, the main control unit 323 performs a redial processing (S22). FIG. 9 shows the redial processing in the processing of FIG. 8, which will be described later.

Figure 10:
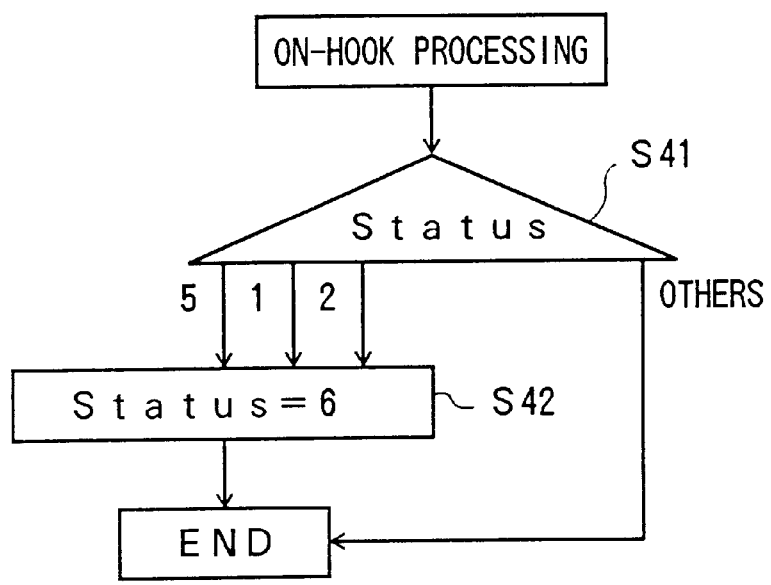
FIG. 10 is a flowchart for explaining an on-hook processing in the processing of FIG. 8.

When the user of the TD 301 places the handset of the TS 305 in the on-hook state during the event analysis condition of the above S21, an on-hook signal sent from the TD 301 is detected by the TS state detection unit 319. The CPU 312 notifies the main control unit 323 via the bus 325 that the on-hook signal from the TD 301 is detected. In the DPD 303, the main control unit 323 performs an on-hook processing (S23). FIG. 10 shows the on-hook processing in the processing of FIG. 8, which will be described later.

Figure 11:
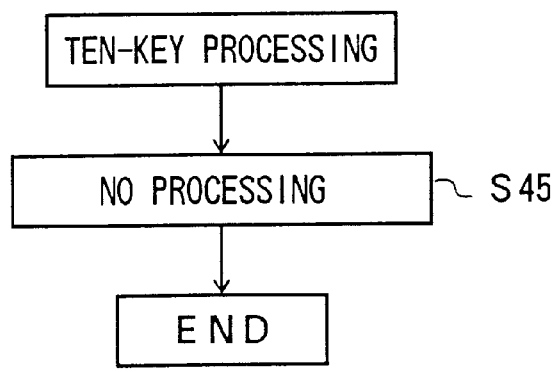
FIG. 11 is a flowchart for explaining a ten-key processing in the processing of FIG. 8.

When the user of the TD 301 presses a key of a ten-key pad (not shown) of the TS 305 during the event analysis condition of the above S21, a ten-key signal sent from the TD 301 is detected by the TS state detection unit 319 in the CCD 302. The CPU 312 notifies the main control unit 323 via the bus 325 that the ten-key signal from the TD 301 is detected. In the DPD 303, the main control unit 323 performs a ten-key processing (S24). FIG. 11 shows the ten-key processing in the processing of FIG. 8, which will be described later.

Figure 12:
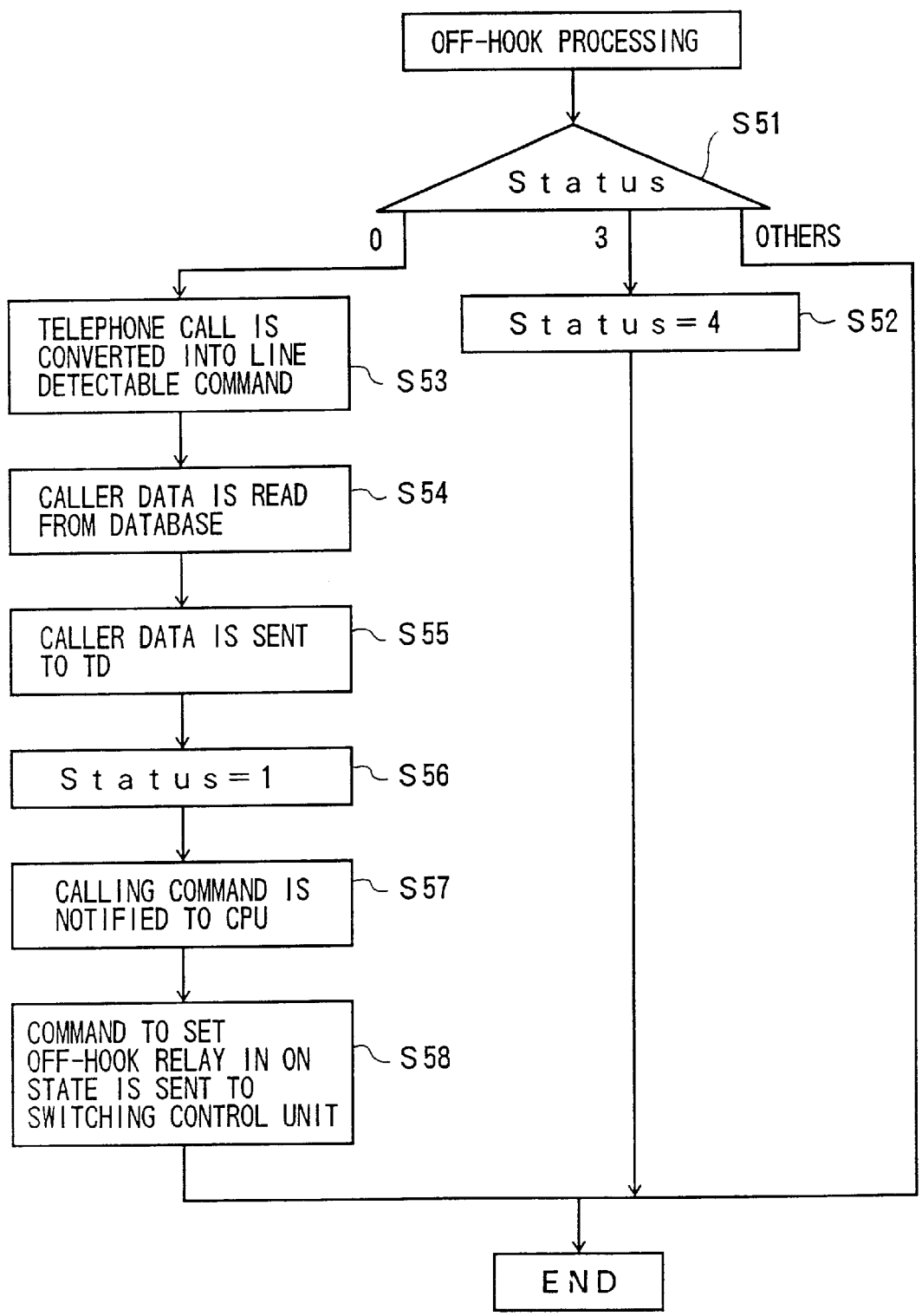
FIG. 12 is a flowchart for explaining an off-hook processing in the processing of FIG. 8.

When the user of the TD 301 places the handset of the TS 305 in the off-hook state during the event analysis condition of the above S21, an off-hook signal sent from the TD 301 is detected by the TS state detection unit 319 in the CCD 302. The CPU 312 notifies the main control unit 323 via the bus 325 that the off-hook signal from the TD 301 is detected. In the DPD 303, the main control unit 323 performs an off-hook processing (S25). FIG. 12 shows the off-hook processing in the processing of FIG. 8, which will be described later.

Figure 13:
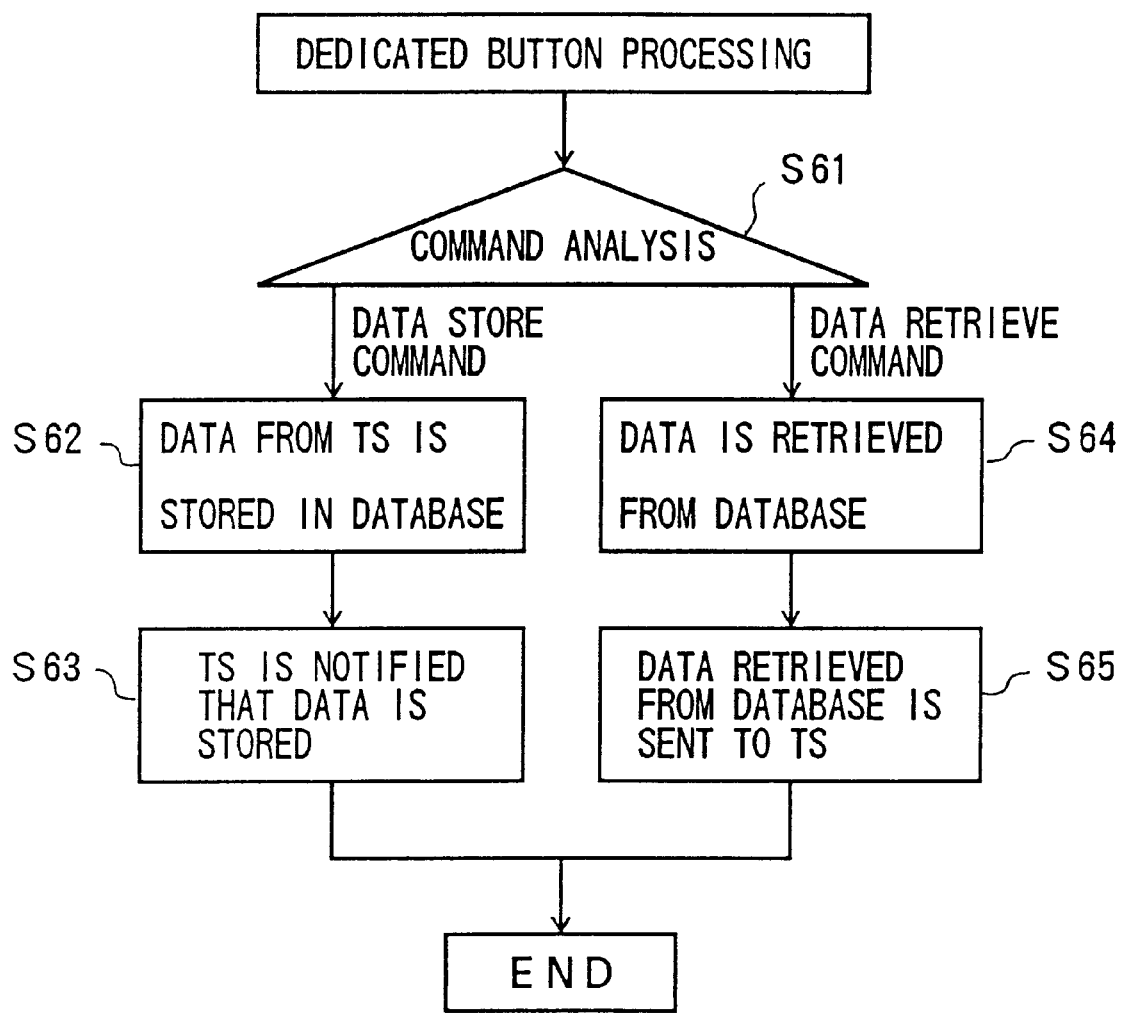
FIG. 13 is a flowchart for explaining a dedicated button processing in the processing of FIG. 8.

When the user of the TD 301 presses a dedicated button (not shown) of the TS 305 during the event analysis condition of the above S21, a DTMF signal from the TS 305 is detected by the DTMF detection unit 318 in the CCD 302. The dedicated button of the TS 305 is specifically designed to transmit the DTMF signal to the CCD 302 when the dedicated button is pressed by the user. The CPU 312 notifies the main control unit 323 via the bus 325 that the DTMF signal from the TD 301 is detected. In the DPD 303, the main control unit 323 performs a dedicated button processing (S26). FIG. 13 shows the dedicated button processing in the processing of FIG. 8, which will be described later.

Figure 14:
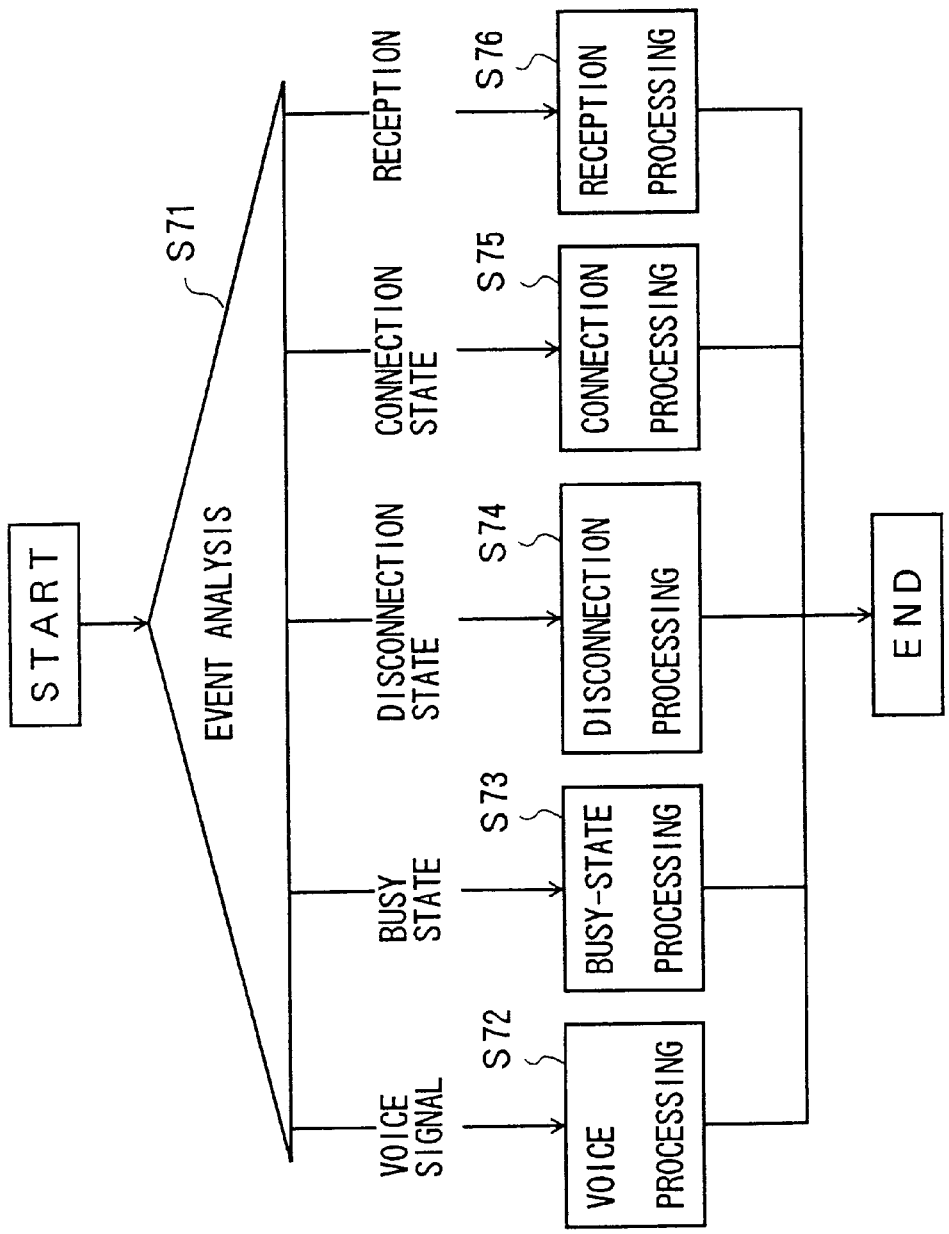
FIG. 14 is a flowchart for explaining a basic processing performed by the communication support system of FIG. 6 in response to an actuating signal sent from a telephone network.

Next, FIG. 14 shows a basic processing performed by the communication support system of FIG. 6 in response to an actuating signal sent from the TN.

At the start of the processing of FIG. 14, power is supplied to the communication support system of FIG. 6 and the communication support system is placed in an event analysis condition (S71). During the event analysis condition, the communication support system is waiting for incoming of a call from the TN 304 or reception of an actuating signal sent from the TN 304, or a telephone call between the TS 305 and the TN 304 is in progress through the communication support system. During the event analysis condition, the CCD 302 is capable of detecting an occurrence of an event due to an actuating signal from the TN 304 or due to an incoming call from the TN 304 by using the ringer detection unit 314 and the TN state detection unit 317.

Similar to the processing of FIG. 8, when the processing of FIG. 14 is performed by the communication support system, the CCD 302 and the DPD 303 manage a status value of the telephone line between the TN 304 and the TD 301 according to the result of the event analysis of the above S71. In the present embodiment, the status value is defined in the same manner as in the processing of FIG. 8.

The status values and the telephone line states mentioned above are given for the sake of convenience of description, and the present invention is not limited to the above-mentioned embodiment.

Figure 15:
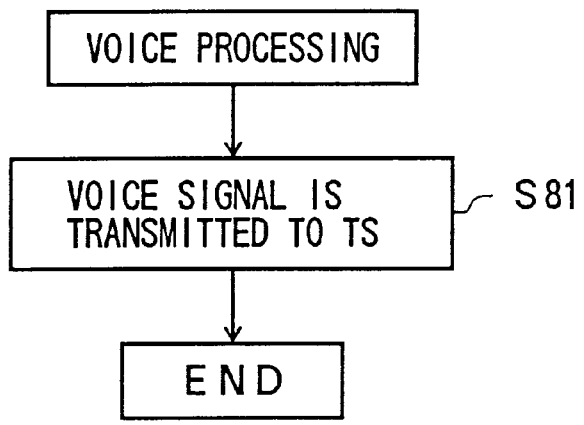
FIG. 15 is a flowchart for explaining a voice processing in the processing of FIG. 14.

When a telephone call between the TN 304 and the TD 301 is in progress and a voice signal from the TN 304 is received by the CCD 302 during the event analysis condition of the above S71, the CPU 312 is notified that the voice signal from the TN 304 is received. The CPU 312 notifies the main control unit 323 via the bus 325 that the voice signal from the TN 304 is detected. The main control unit 323 performs a voice processing based on the received voice signal (S72). FIG. 15 shows the voice processing in the processing of FIG. 14, which will be described later.

Figure 16:
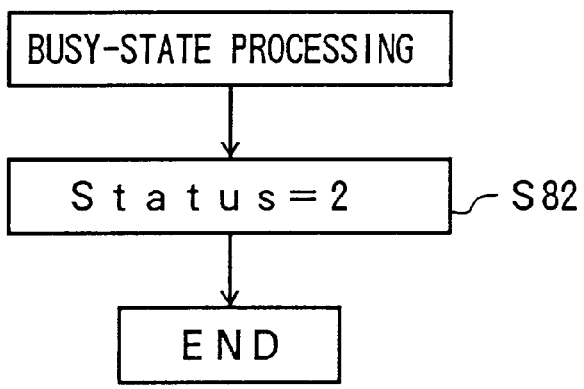
FIG. 16 is a flowchart for explaining a busy-state processing in the processing of FIG. 14.

When a telephone call from the TD 301 is transmitted to a destination terminal in the TN 304 and the TN 304 is in a busy state, the busy state of the TN 304 is detected by the TN state detection unit 317. The CPU 312 notifies the main control unit 323 via the bus 325 that the busy state of the TN 304 is detected. In the DPD 303, the main control unit 323 performs a busy-state processing (S73). FIG. 16 shows the busy-state processing in the processing of FIG. 14, which will be described later.

Figure 17:
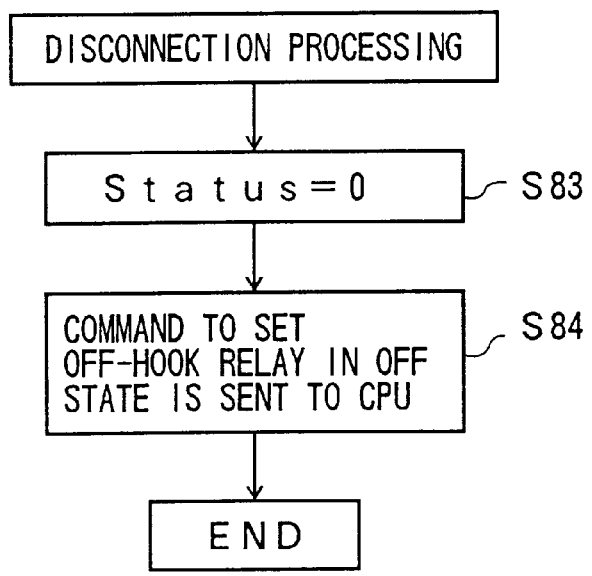
FIG. 17 is a flowchart for explaining a disconnection processing in the processing of FIG. 14.

When a telephone call between the TN 304 and the TD 301 is in progress and a disconnection signal from the TN 304 is received by the CCD 302 during the event analysis condition of the above S71, the line disconnection state of the TN 304 is detected by the TN state detection unit 317. The CPU 312 notifies the main control unit 323 via the bus 325 that the disconnection signal from the TN 304 is detected. In the DPD 303, the main control unit 323 performs a disconnection processing (S74). FIG. 17 shows the disconnection processing in the processing of FIG. 14, which will be described later.

Figure 18:
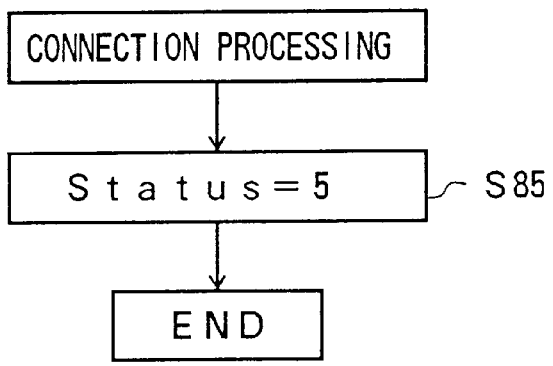
FIG. 18 is a flowchart for explaining a connection processing in the processing of FIG. 14.

When a connection signal from the TN 304 is received by the CCD 302 during the event analysis condition of the above S71, the line connection state of the TN 304 is detected by the TN state detection unit 317. The CPU 312 notifies the main control unit 323 via the bus 325 that the line connection state of the TN 304 is detected. In the DPD 303, the main control unit 323 performs a connection processing (S75). FIG. 18 shows the connection processing in the processing of FIG. 14, which will be described later.

Figure 19:
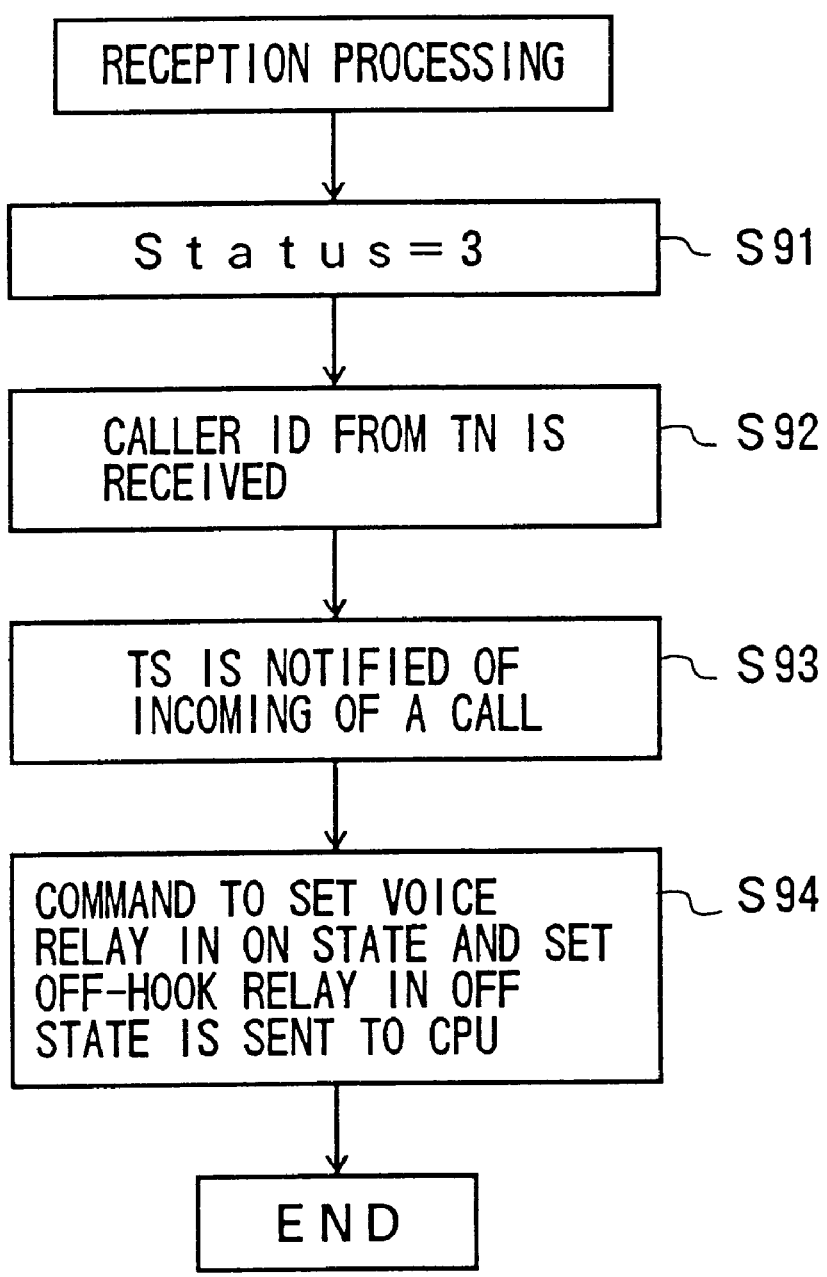
FIG. 19 is a flowchart for explaining a reception processing in the processing of FIG. 14.

When an incoming call from the TN 304 is received by the CCD 302 during the event analysis condition of the above S71, the reception of the call from the TN 304 is detected by the ringer detection unit 314. The CPU 312 notifies the main control unit 323 via the bus 325 that the reception of the call from the TN 304 is detected. In the DPD 303, the main control unit 323 performs a reception processing (S76). FIG. 19 shows the reception processing in the processing of FIG. 14., which will be described later.

As described above, when the user of the TD 301 presses the redial button of the TS 305 during the event analysis condition of the above S21 and the main control unit 323 is notified that the redial signal from the TD 301 is detected the main control unit 323 performs the redial processing of FIG. 9.

At the start of the redial processing of FIG. 9, the program code instructions cause the main control unit 323 to perform a status checking (S31). In the status checking of the above S31, the main control unit 323 determines whether the status value is currently equal to 0 (or 1). When the status value is equal to 0 (or 1), the program code instructions cause the main control unit 323 to convert a stored telephone number for a destination terminal in the TN 304 into a line detectable command (S32). The program code instructions cause the main control unit 323 to convert a telephone call of the telephone number into a line detectable command (S33). The program code instructions cause the main control unit 323 to set the status value at 1 (S34). In the present embodiment, the status value "1" indicates the calling state of the telephone line.

After the setting of the status value of the above S34 is performed, the program code instructions cause the main control unit 323 to notifies the call accepting command to the CPU 312 (S35). In the CCD 302, the program code instructions cause the CPU 312 to transmit a line switching command to set the off-hook relay 310 in the on state, to the switching control unit 315 (S36). The switching control unit 315 sets the off-hook relay 310 in the on state, and the CPU 312 transmits the call accepting command to the TN 304 through the line interface 313. After the above S36 is performed, the program code instructions cause the main control unit 323 to end the redial processing of FIG. 9.

When the status value is not equal to 0 (or 1) in the status checking of the above S31, the program code instructions cause the main control unit 323 to end the redial processing of FIG. 9.

As described above, when the user of the TD 301 places the handset of the TS 305 in the on-hook state during the event analysis condition of the above S21 and the main control unit 323 is notified that the on-hook state of the TS 305 is detected, the main control unit 323 performs the on-hook processing of FIG. 10.

At the start of the on-hook processing of FIG. 10, the program code instructions cause the main control unit 323 to perform a status checking (S41). In the status checking of the above S41, the main control unit 323 determines whether the status value is currently equal to 1 (or 2 or 5). When the status value is equal to 1 (or 2 or 5), the program code instructions cause the main control unit 323 to set the status value of the telephone line at 6 (S42). In the present embodiment, the status value "6" indicates the disconnection state of the telephone line. After the setting of the status value of the above S42 is performed, the program code instructions cause the main control unit 323 to end the on-hook processing of FIG. 10.

On the other hand, when the status value is not equal to 1 (or 2 or 5) in the status checking of the above S41, the program code instructions cause the main control unit 323 to end the redial processing of FIG. 10.

As described above, when the user of the TD 301 presses a key of the ten-key pad of the TS 305 during the event analysis condition of the above S21 and the main control unit 323 is notified that the ten-key signal from the TS 305 is detected, the main control unit 323 performs the ten-key processing of FIG. 11.

During the ten-key processing of FIG. 11, the program code instructions cause the main control unit 323 to perform no processing (S45). Then, the program code instructions cause the main control unit 323 to immediately end the ten-key processing of FIG. 11.

As described above, when the user of the TD 301 places the handset of the TS 305 in the off-hook state during the event analysis condition of the above S21 and the main control unit 323 is notified that the off-hook signal from the TS 305 is detected, the main control unit 323 performs the off-hook processing of FIG. 12.

At the start of the off-hook processing of FIG. 12, the program code instructions cause the main control unit 323 to perform a status checking (S51). In the status checking of the above S51, the main control unit 323 determines whether the status value is currently equal to 0 (or 3). When the status value is equal to 0, the program code instructions cause the main control unit 323 to convert a telephone call into a line detectable command (S53). The program code instructions cause the main control unit 323 to retrieve corresponding caller profile (for example, a caller name) for the caller ID from the database 324 (S54). The program code instructions cause the main control unit 323 to transmit the caller profile from the database 324 to the TD 301 through the CCD 302 (S55). The program code instructions cause the main control unit 323 to set the status value of the telephone line at 1 (S56). In the present embodiment, the status value "1" indicates the calling state of the telephone line.

After the setting of the status value of the above S56 is performed, the program code instructions cause the main control unit 323 to notify the call accepting command to the CPU 312 (S57). In the CCD 302, the program code instructions cause the CPU 312 to transmit a line switching command to set the off-hook relay 310 in the on state, to the switching control unit 315 (S58). The switching control unit 315 sets the off-hook relay 310 in the on state, and the CPU 312 transmits the calling command to the TN 304 through the line interface 313. After the above S58 is performed, the program code instructions cause the main control unit 323 to end the off-hook processing of FIG. 12.

When the status value is equal to 3 in the status checking of the above S51, the program code instructions cause the main control unit 323 to set the status value at 4 (S52). In the present embodiment, the status value "4" indicates the connection processing state of the telephone line. After the above S52 is performed, the program code instructions cause the main control unit 323 to end the off-hook processing of FIG. 12.

When the status value is not equal to 0 (or 3) in the status checking of the above S51, the program code instructions cause the main control unit 323 to end the off-hook processing of FIG. 12.

As described above, when the user of the TD 301 presses the dedicated button of the TS 305 during the event analysis condition of the above S21 and the main control unit 323 is notified that a DTMF signal from the TD 301 is detected, the main control unit 323 performs the dedicated button processing of FIG. 13.

At the start of the dedicated button processing of FIG. 13, the program code instructions cause the main control unit 323 to perform a command analysis (S61). In the command analysis of the above S61, the main control unit 323 determines whether the DTMF signal from the TD 301 indicates a data store command for storing data (for example, an input telephone number) from the TS 305 in the database 324 of the DPD 303, or a data retrieve command for retrieving display data (for example, a caller name) from the database 324 of the DPD 303.

When it is determined by the command analysis of the above S61 that the DTMF signal indicates the data store command, the program code instructions cause the main control unit 323 to store the data from the TS 305 into the database 324 of the DPD 303 (S62). The program code instructions cause the main control unit 323 to notify the TS 305 that the data from the TS 305 is stored in the database 324 (S63). After the above S63 is performed, the program code instructions cause the main control unit 323 to end the dedicated button processing of FIG. 13.

When it is determined by the command analysis of the above S61 that the DTMF signal indicates the data retrieve command, the program code instructions cause the main control unit 323 to retrieve the caller profile from the database 324 of the DPD 303 (S64). The program code instructions cause the main control unit 323 to transmit the caller profile from the DPD 303 to the TD 301 through the CCD 302 (S65). After the above S65 is performed, the program code instructions cause the main control unit 323 to end the dedicated button processing of FIG. 13.

As described above, when a telephone call between the TN 304 and the TD 301 is in progress and a voice signal from the TN 304 is received by the CCD 302 during the event analysis condition of the above S71, the CPU 312 is notified that the voice signal from the TN 304 is received. The CPU 312 notifies the main control unit 323 via the bus 325 that the voice signal from the TN 304 is detected. The main control unit 323 performs the voice processing of FIG. 15 based on the received voice signal.

During the voice processing of FIG. 15, the program code instructions cause the main control unit to control the CPU 312 so that the voice signal from the TN 304 is transmitted to the TS 305 through the display data multiplexer 320 (S81). In a case in which a multiplexed signal is produced by the display data multiplexer 320 from the voice signal from the TN 304 and display data from the database 324 of the DPD 303, the multiplexed signal from the display data multiplexer 320 is transmitted to the TD 301 through the telephone/PC interface 322 (S81).

As described above, when a call from the TD 301 is transmitted to the destination terminal in the TN 304 and the TN 304 is in the busy state, the busy state of the TN 304 is detected by the TN state detection unit 317. The CPU 312 notifies the main control unit 323 via the bus 325 that the busy state of the TN 304 is detected. In the DPD 303, the main control unit 323 performs the busy-state processing of FIG. 16.

During the busy-state processing of FIG. 16, the program code instructions cause the main control unit 323 to set the status value at 2 (S82). In the present embodiment, the status value "2" indicates the busy state of the telephone line. After the above S82 is performed, the program code instructions cause the main control unit 323 to end the busy-state processing of FIG. 16.

As described above, when a telephone call between the TN 304 and the TD 301 is in progress and a disconnection signal from the TN 304 is received by the CCD 302 during the event analysis condition of the above S71, the line disconnection state of the TN 304 is detected by the TN state detection unit 317. The CPU 312 notifies the main control unit 323 via the bus 325 that the disconnection signal from the TN 304 is detected. In the DPD 303, the main control unit 323 performs the disconnection processing of FIG. 17.

At the start of the disconnection processing of FIG. 17, the program code instructions cause the main control unit 323 to set the status value at 0 (S83). In the present embodiment, the status value "0" indicates the vacant state of the telephone line. After the above S83 is performed, the program code instructions cause the main control unit 323 to transmit a line switching command to set the off-hook relay 310 in the off state, to the CPU 312 (S84). After the above S84 is performed, the program code instructions cause the main control unit 323 to end the disconnection processing of FIG. 17.

As described above, when a connection signal from the TN 304 is received by the CCD 302 during the event analysis condition of the above S71, the line connection state of the TN 304 is detected by the TN state detection unit 317. The CPU 312 notifies the main control unit 323 via the bus 325 that the line connection state of the TN 304 is detected.

In the DPD 303, the main control unit 323 performs the connection processing of FIG. 18.

During the connection processing of FIG. 18, the program code instructions cause the main control unit 323 to set the status value at 5 (S85). In the present embodiment, the status value "5" indicates the connection state of the telephone line. After the above S85 is performed, the program code instructions cause the main control unit 323 to end the connection processing of FIG. 18.

As described above, when an incoming call from the TN 304 is received by the CCD 302 during the event analysis condition of the above S71, the reception of the call from the TN 304 is detected by the ringer detection unit 314. The CPU 312 notifies the main control unit 323 via the bus 325 that the reception of the call from the TN 304 is detected. In the DPD 303, the main control unit 323 performs the reception processing of FIG. 19.

At the start of the reception processing of FIG. 19, the program code instructions cause the main control unit 323 to set the status value at 3(S91). In the present embodiment, the status value "3" indicates the reception state of the telephone line. After the above S91 is performed, the program code instructions cause the main control unit 323 to receive the caller ID from the TN 304 (S92). After the above S92, the program code instructions cause the main control unit 323 to notify the TS 305 that the reception of the call from the TN 304 is detected (S93). After the above S93, the program code instructions cause the main control unit 323 to transmit a line switching command to set the voice relay 311 in the on state and set the off-hook relay 310 in the off state, to the CPU 312 (S94). After the above S94, the program code instructions cause the main control unit 323 to end the reception processing of FIG. 19.

Figure 20:
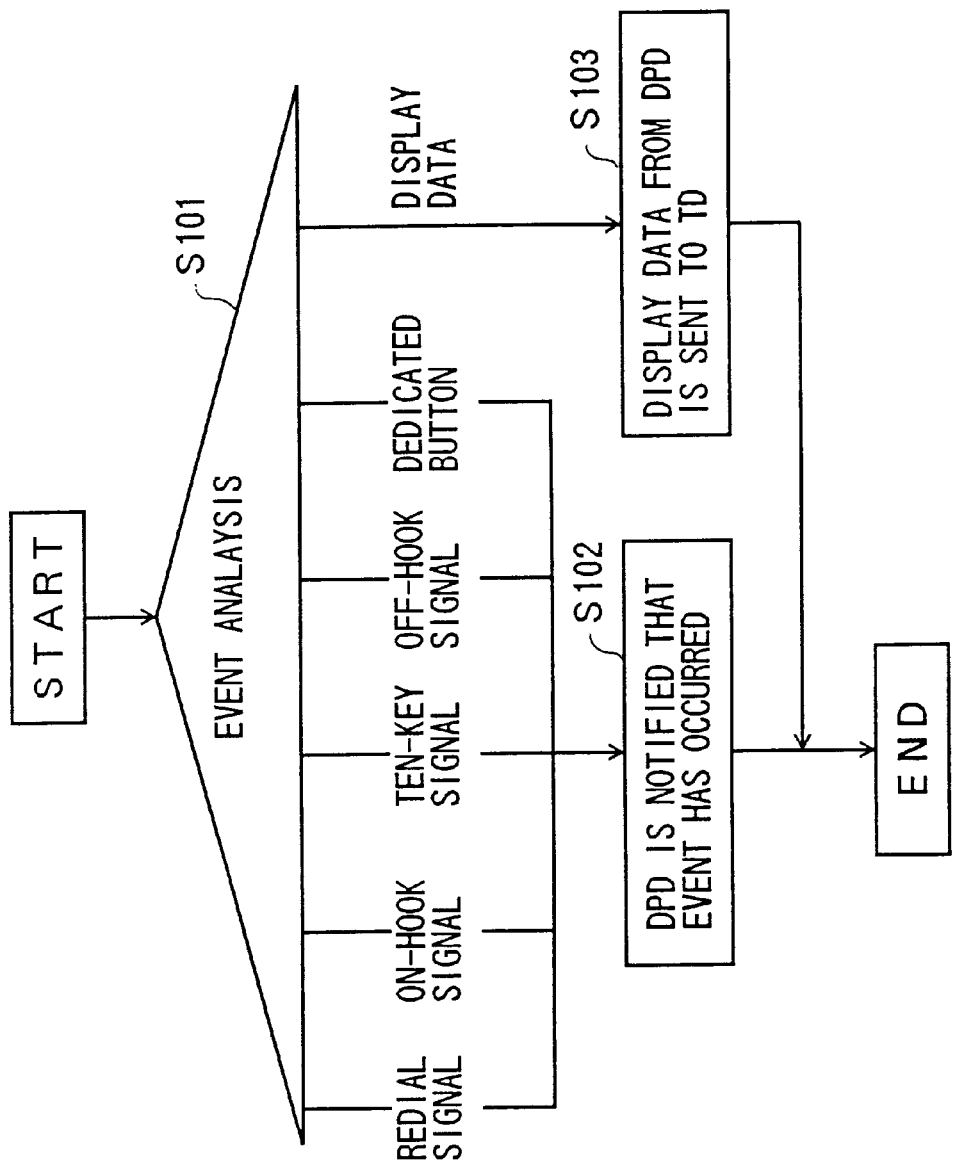
FIG. 20 is a flowchart for explaining a basic processing performed by a telephone device during the processing of FIG. 8 or the processing of FIG. 14.

Next, FIG. 20 shows a basic processing performed by the telephone device (TD) 301 during the processing of FIG. 8 or the processing of FIG. 14.

At the start of the basic processing of FIG. 20, the TD 301 is placed in an event analysis condition (S101). During the event analysis condition, the TD 301 is waiting for a reception of an actuating signal sent by the TS 305. During the event analysis condition, the CCD 302 is capable of detecting an occurrence of an event due to an actuating signal from the TS 305 by using the DTMF detection unit 318 and the TS state detection unit 319.

When one of a redial signal, an on-hook signal, a ten-key signal, an off-hook signal and a DTMF signal is sent by the TD 305 during the event analysis condition of the above S101, the control signal multiplexer 307 transmits a multiplexed signal including the actuating signal to the CCD 302 via the telephone/PC interface 309 (S102). In the CCD 302, the demultiplexer 321 separates the multiplexed signal from the TD 301 into the voice signal and the control signal (or the actuating signal from the TD 301), and this control signal is detected by the DTMF detection unit 318 and the TS state detection unit 319 in the CCD 302. The CPU 312 notifies the main control unit 323 via the bus 325 that an event has occurred due to the actuating signal from the TD 305 (S102). After the above S102 is performed, the processing of FIG. 20 ends.

When a telephone call between the TN 304 and the TS 305 is in progress, the control signal multiplexer 307 transmits a multiplexed signal including the voice signal and the control signal to the CCD 302 via the telephone/PC interface 309.

When a multiplexed signal including the display data (for example, the caller profile) from the DPD 303 is received by the TD 301 during the event analysis condition of the above S101, the demultiplexer 308 separates the multiplexed signal from the DPD 303 into the voice signal and the display data, and transmits the display data to the display 306 so that the display data is displayed on the display 306 (S103). After the above S103 is performed, the processing of FIG. 20 ends.

When a telephone call between the TN 304 and the TS 305 is in progress, the demultiplexer 308 separates the multiplexed signal from the CCD 302 into the voice signal from the TN 304 and the display data from the DPD 303. By using the demultiplexer 308, the voice signal from the TN 304 is vocalized by the TS 305, and, at the same time, the display data from the DPD 303 is displayed on the display 306 of the TD 301.

Figure 21:
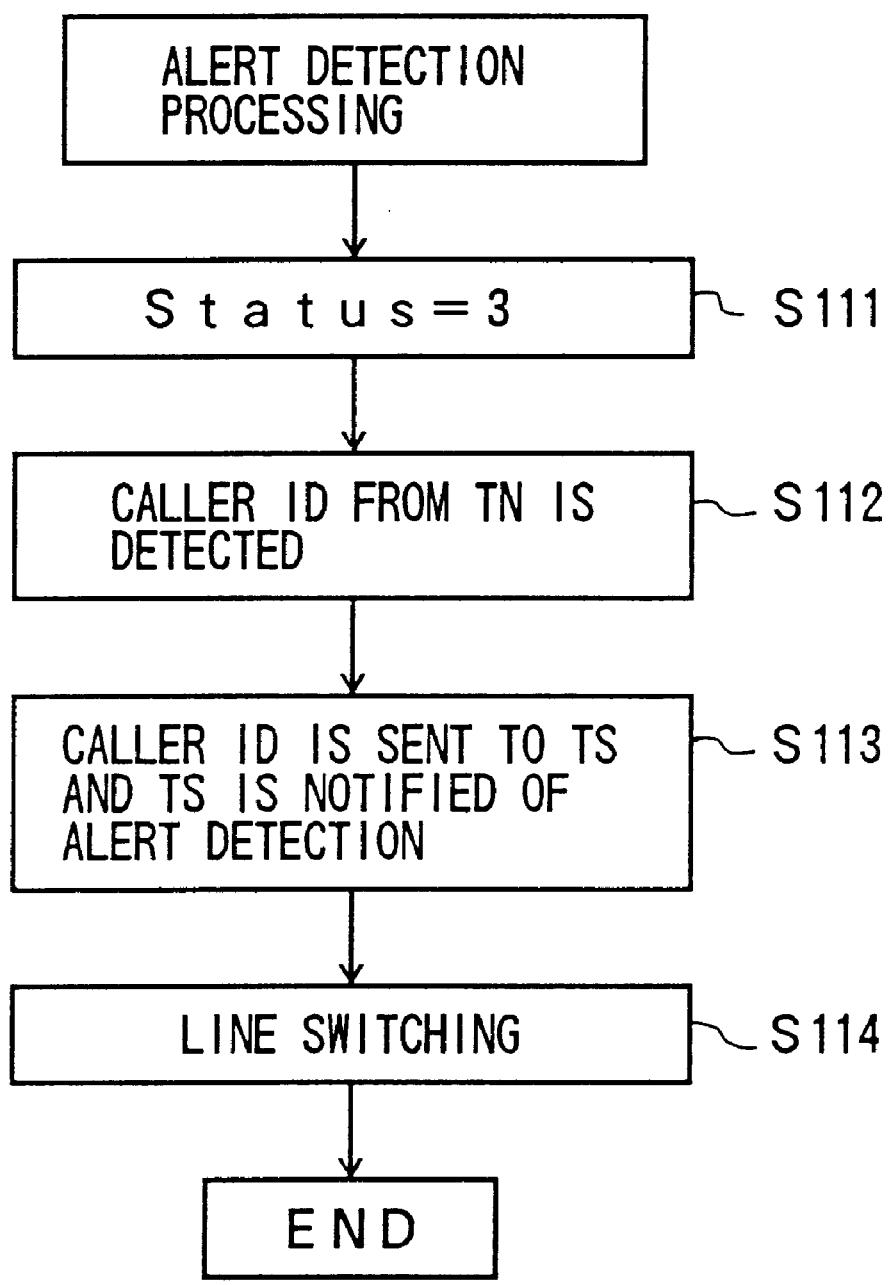
FIG. 21 is a flowchart for explaining another reception processing performed by the communication support system of FIG. 6.

Next, FIG. 21 shows a reception processing performed by the communication support system of FIG. 6 in which a caller ID is displayed on the display of the TD upon incoming of a call from the TN.

At the start of the reception processing of FIG. 21, incoming of a call from the TN 304 is detected by the ringer detection unit 314, and the CPU 312 notifies the main control unit 323 of the reception. The main control unit 323 at this time performs the reception processing of FIG. 21. The program code instructions cause the main control unit 323 to set the status value at 3 (S111). In the present embodiment, the status value "3" indicates the reception state of the telephone line.

After the setting of the status value of the above S111, the main control unit 323 transmits a line switching command to set the voice relay 311 in the off state and set the off-hook relay 310 in the on state, to the CPU 312. In the CCD 302, the CPU 312 controls the switching control unit 315 based on the command so that the voice relay 311 is set in the off state and the off-hook relay 310 is set in the on state. A caller ID from the TN 304 is detected by the caller ID detection unit 316. After the line switching in the CCD 302 is performed, the program code instructions cause the main control unit 323 to receive the caller ID from the TN 304 (S112).

After the reception of the caller ID of the above S112 is performed, the program code instructions cause the main control unit 323 to transmit the caller ID to the display data multiplexer 320 so that the multiplexer 320 transmits a multiplexed signal (including the caller ID) to the TS 305 via the telephone/PC interface 322 (S113). In the TD 301, the demultiplexer 308 separates the multiplexed signal into the caller ID and transmits the caller ID to the display 306. Therefore, the user of the TD 301 can know, upon incoming of the call, the caller ID on the display 306 of the TD 301, and it is not necessary for the user to go to the location of the DPD 303. Further, the program code instructions cause the main control unit 323 to notify the TS 305 that the reception of the call from the TN 304 is detected (S113).

After the above S113 is performed, the program code instructions cause the main control unit 323 to transmit a line switching command to set the voice relay 311 in the on state and set the off-hook relay 310 in the off state, to the CPU 312 (S114). After the above S114 is performed, the program code instructions cause the main control unit 323 to end the reception processing of FIG. 21.

Figure 22:
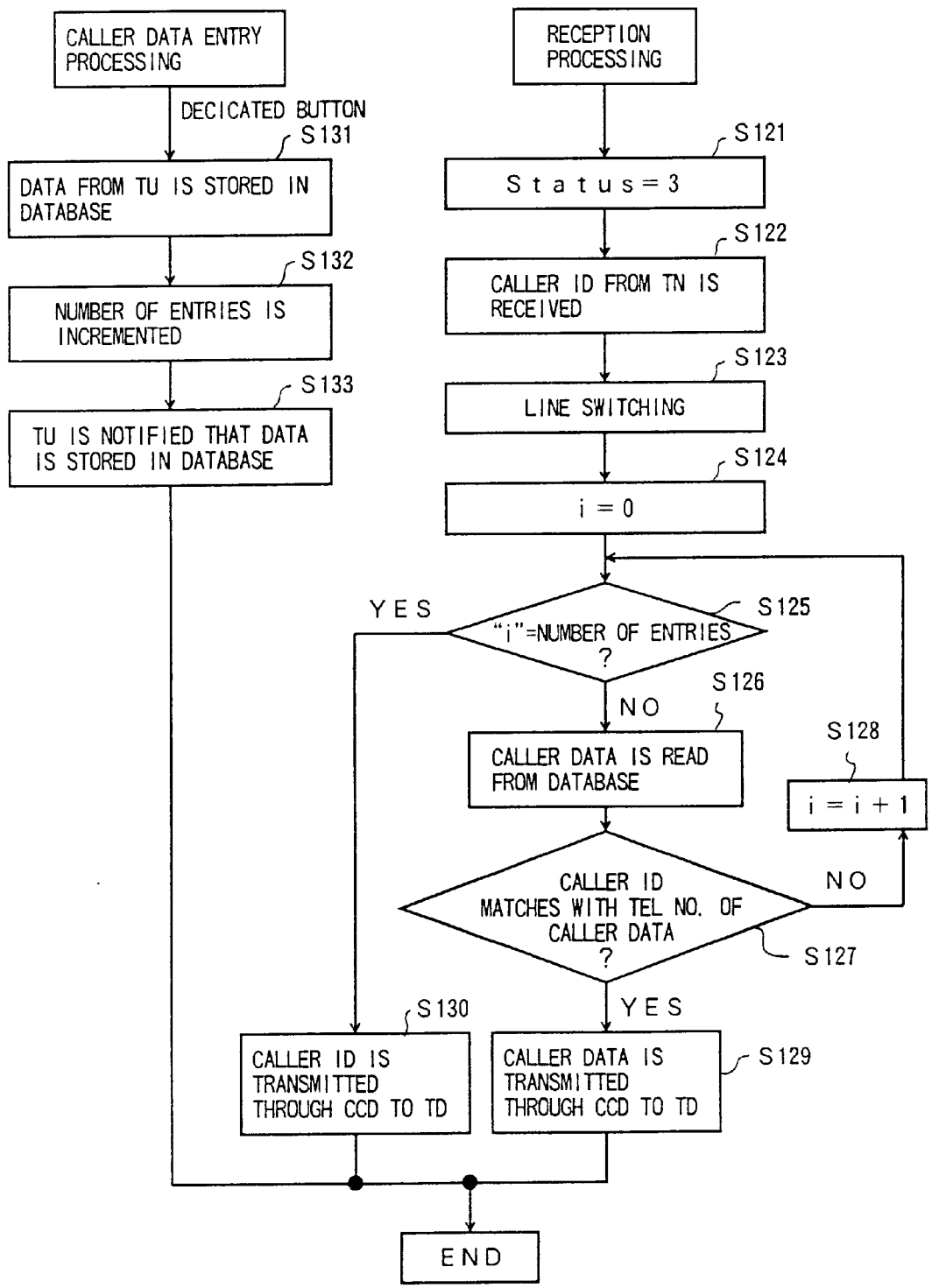
FIG. 22 is a flowchart for explaining still another reception processing and a caller profile entry processing performed by the communication support system of FIG. 6.

Next, FIG. 22 shows a reception processing performed by the communication support system of FIG. 6 in which a caller ID and caller profile are displayed on the display of the TD upon incoming of a call from the TN.

In the present embodiment, incoming of a call from the TN 304 is detected by the ringer detection unit 314, and the CPU 312 notifies the main control unit 323 of the reception. The main control unit 323 at this time performs the reception processing of FIG. 22. The program code instructions cause the main control unit 323 to set the status value at 3 (S121). In the present embodiment, the status value "3" indicates the reception state of the telephone line.

After the setting of the status value of the above S121, the main control unit 323 transmits a line switching command to set the voice relay 311 in the off state and set the off-hook relay 310 in the on state, to the CPU 312. In the CCD 302, the CPU 312 controls the switching control unit 315 based on the command so that the voice relay 311 is set in the off state and the off-hook relay 310 is set in the on state. A caller ID from the TN 304 is detected by the caller ID detection unit 316. After the line switching in the CCD 302 is performed, the program code instructions cause the main control unit 323 to receive the caller ID from the TN 304 (S122).

After the reception of the caller ID of the above S122 is performed, the program code instructions cause the main control unit 323 to transmit a line switching command to set the voice relay 311 in the on state and set the off-hook relay 310 in the off state, to the CPU 312 (S123). In the CCD 302, the CPU 312 controls the switching control unit 315 based on the command so that the switching control unit 315 sets the voice relay 311 in the on state and sets the off-hook relay 310 in the off state.

After the above S123 is performed, the program code instructions cause the main control unit 323 to retrieve corresponding caller profile (for example, a caller name) in the database 324 for the caller ID as follows.

The program code instructions cause the main control unit 323 to set a variable "i" at 0 (S124). The program code instructions cause the main control unit 323 to determine whether the variable "i" is equal to the number of caller profile entries in a data management table of the database 324 (S125).

When no caller profile entry is included in the data management table of the database 324, it is determined that the result of the above S125 is affirmative. In this case, the program code instructions cause the main control unit 323 to transmit the caller ID (the telephone number) to the display data multiplexer 320 via the bus 325 so that the multiplexer 320 transmits a multiplexed signal (including the caller ID) to the TS 305 via the telephone/PC interface 322 (S130). In the TD 301, the demultiplexer 308 separates the multiplexed signal into the caller ID and transmits the caller ID to the display 306. Therefore, the user of the TD 301 can know, upon incoming of the call, the caller ID on the display 306 of the TD 301, and it is not necessary for the user to go to the location of the DPD 303.

On the other hand, when at least one caller profile entry is included in the data management table of the database 324, it is determined that the result of the above S125 is negative. In this case, the program code instructions cause the main control unit 323 to retrieve a corresponding caller profile item for the variable "i" from the data management table of the database 324 (S126).

FIG. 28A shows a format of the data management table of the database 324 in the present embodiment, and FIG. 28B shows an example of display data on the display 306 of the TD 301. In FIG. 28A, "n" is an arbitrary integer.

After the above S126 is performed, the program code instructions cause the main control unit 323 to determine whether a telephone number of the caller profile (the data item for the variable "i") read from the database 324 matches with the caller ID from the TN 304 (S127).

When the result of the above S127 is negative, the program code instructions cause the main control unit 323 to increment the variable "i" (i=i+1) (S128). The program code instructions cause the main control unit 323 to repeat the above steps S125–S128 until the result of the above S127 becomes affirmative.

When the result of the above S127 is affirmative, it is determined that the caller profile read from the database 324 in the above S126 matches with the caller ID from the TN 304. In this case, the program code instructions cause the main control unit 323 to transmit the caller profile (for example, the caller name and other information) to the display data multiplexer 320 via the bus 325 so that the multiplexer 320 transmits a multiplexed signal (including the caller profile) to the TS 305 via the telephone/PC interface 322 (S129). In the TD 301, the demultiplexer 308 separates the multiplexed signal into the caller profile and transmits the caller profile to the display 306. Therefore, the user of the TD 301 can know, upon incoming of the call, the caller profile on the display 306 of the TD 301 as shown in FIG. 28B, and it is not necessary for the user to go to the location of the DPD 303.

After the above S129 or the above S130 is performed, the program code instructions cause the main control unit 323 to end the reception processing of FIG. 22.

Further, FIG. 22 shows a caller profile entry processing performed by the communication support system of FIG. 6 in response to a DTMF signal sent by the TS when a dedicated button of the TS is pressed.

In the present embodiment, the user of the TD 301 presses a dedicated button of the TS 305 in the event analysis condition of the above S21 (see FIG. 8). The dedicated button of the TS 305 is specifically designed to transmit a DTMF signal to the CCD 302 when the dedicated button is pressed by the user, and the DTMF signal indicates the caller profile entry processing which is one of a plurality of telephone services provided by the DPD 303. The DTMF signal sent by the TS 305 is detected by the DTMF detection unit 318, and the CPU 312 notifies the main control unit 323 that the DTMF signal from the TD 301 is detected. The main control unit 323 at this time performs the caller profile entry processing of FIG. 22 in order to create the data management table in the database 324 as shown in FIG. 28A.

At the start of the caller profile entry processing of FIG. 22, the program code instructions cause the main control unit 323 to store a new caller profile item, sent from the TS 305, into the database 324 (S131). After the above S131 is performed, the program code instructions cause the main control unit 323 to increment the number of entries in the data management table of the database 324 so that the incremented number of entries is stored in the data management table of the database 324 (S132). After the above S132 is performed, the program code instructions cause the main control unit 323 to notify the TS 305 that the new caller profile item is added to the data management table of the database 324 (S133). After the above S133 is performed, the program code instructions cause the main control unit 323 to end the caller profile entry processing of FIG. 22.

Figure 23:
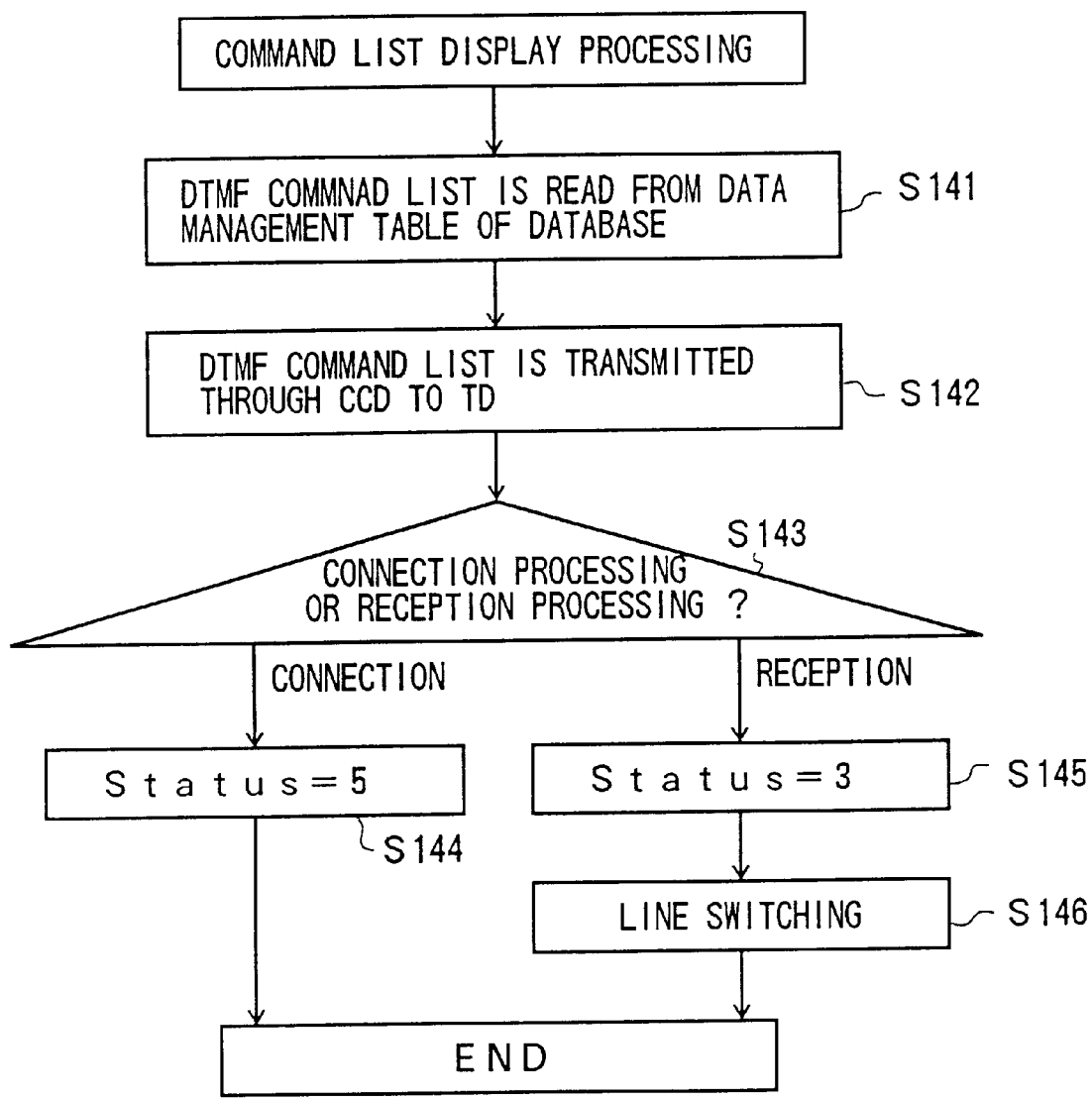
FIG. 23 is a flowchart for explaining a command list display processing performed by the communication support system of FIG. 6 in response to an actuating signal sent from the telephone network.

FIG. 23 shows a command list display processing performed by the communication support system of FIG. 6 in response to an actuating signal sent from the TN.

In the present embodiment, incoming of a call from the TN 304 is detected by the ringer detection unit 314, and the CPU 312 notifies the main control unit 323 of the reception. The main control unit 323 at this time performs the command list display processing of FIG. 23. The program code instructions cause the main control unit 323 to retrieve a DTMF command list from the data management table of the database 324 (S141).

FIG. 29A shows a format of the DTMF command list of the data management table of the database 324 in the present embodiment, and FIG. 29B shows an example of display data for the display 306 of the TD 301 with respect to the DTMF command list.

After the retrieving of the DTMF command list of the above S141 is performed, the program code instructions cause the main control unit 323 to transmit the DTMF command list to the display data multiplexer 320 via the bus 325 so that the multiplexer 320 transmits a multiplexed signal (including the DTMF command list data) to the TS 305 via the telephone/PC interface 322 (S142). In the TD 301, the demultiplexer 308 separates the multiplexed signal into the DTMF command list data and transmits the DTMF command list data to the display 306. Therefore, the user of the TD 301 can know, upon incoming of the call, the DTMF command list data on the display 306 of the TD 301 as shown in FIG. 29B, and it is not necessary for the user to go to the location of the DPD 303.

After the above S142 is performed, the program code instructions cause the main control unit 323 to determine whether the main control unit 323 is performing the reception processing or the connection processing (S143). In the present embodiment, it is determined that the main control unit 323 is performing the reception processing. The program code instructions cause the main control unit 323 to set the status value at 3 (S145). After the above S145 is performed, the program code instructions cause the main control unit 323 to transmit a line switching command to set the voice relay 311 in the on state and set the off-hook relay 310 in the off state, to the CPU 312 (S146). In the CCD 302, the CPU 312 controls the switching control unit 315 based on the command so that the switching control unit 315 sets the voice relay 311 in the on state and sets the off-hook relay 310 in the off state. After the above S146 is performed, the program code instructions cause the main control unit 323 to end the command list display processing of FIG. 23.

Further, in the present embodiment, the connection state of the telephone line between the TN 304 and the TS 305 is detected by the TN state detection unit 317, and the CPU 312 notifies the main control unit 323 of the connection state. Similar to the previous embodiment, the main control unit 323 performs the command list display processing of FIG. 23. The program code instructions cause the main control unit 323 to retrieve a DTMF command list from the data management table of the database 324 (S141).

After the retrieving of the DTMF command list of the above S141 is performed, the program code instructions cause the main control unit 323 to transmit the DTMF command list to the display data multiplexer 320 via the bus 325 so that the multiplexer 320 transmits a multiplexed signal (including the DTMF command list data) to the TS 305 via the telephone/PC interface 322 (S142). In the TD 301, the demultiplexer 308 separates the multiplexed signal into the DTMF command list data and transmits the DTMF command list data to the display 306. Therefore, the user of the TD 301 can know, upon incoming of the call, the DTMF command list data on the display 306 of the TD 301 as shown in FIG. 29B, and it is not necessary for the user to go to the location of the DPD 303.

After the above S142 is performed, the program code instructions cause the main control unit 323 to determine whether the main control unit 323 is performing the reception processing or the connection processing (S143). In the present embodiment, it is determined that the main control unit 323 is performing the connection processing. The program code instructions cause the main control unit 323 to set the status value at 5 (S144). After the above S145 is performed, the program code instructions cause the main control unit 323 to end the command list display processing of FIG. 23.

Figure 24:
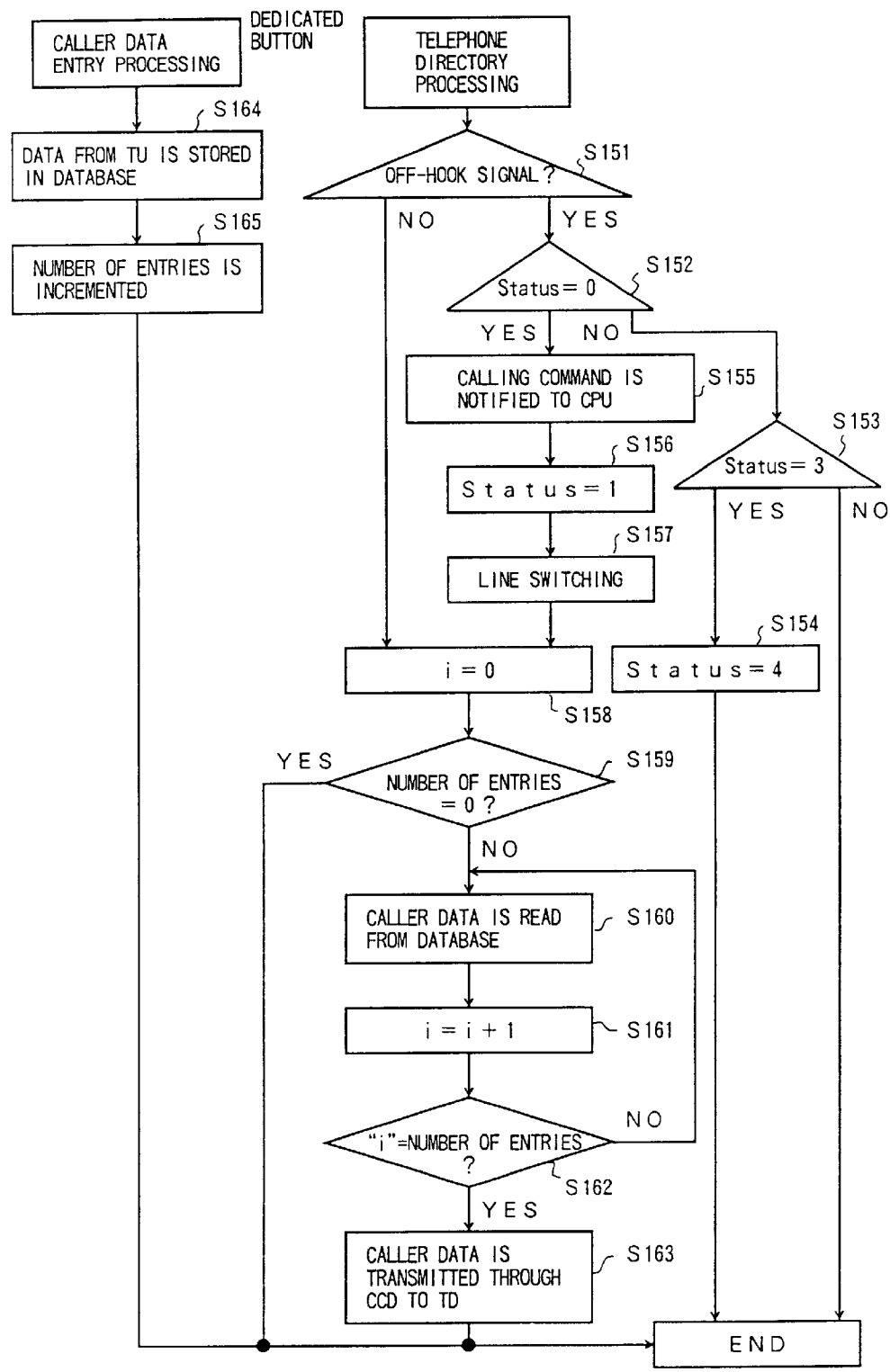
FIG. 24 is a flowchart for explaining a telephone directory processing and a caller profile entry processing performed by the communication support system of FIG. 6.

FIG. 24 shows a telephone directory processing performed by the communication support system of FIG. 6 in response to an actuating signal sent by the TS.

In the present embodiment, when the off-hook signal sent by the TS 305 is detected by the TS state detection unit 319 during the event analysis condition of the above S21 (FIG. 8), the CPU 312 notifies the main control unit 323 of the detection. The main control unit 323 at this time performs the telephone directory processing of FIG. 24.

At the start of the telephone directory processing of FIG. 24, the program code instructions cause the CPU 312 to determine whether the TS state detection unit 319 detects the off-hook signal sent by the TS 305 (S151).

When the result of the above S151 is affirmative, the CPU 312 notifies the main control unit 323 that the off-hook signal sent by the TS 305 is detected. The program code instructions cause the main control unit 323 to determine whether the status value is equal to 0 (S152). When the result of the above S152 is negative, the program code instructions cause the main control unit 323 to determine whether the status value is equal to 3 (S153).

When the result of the above S153 is negative, the program code instructions cause the main control unit 323 to end the telephone directory processing of FIG. 24.

When the result of the above S153 is affirmative, the program code instructions cause the main control unit 323 to set the status value at 4 (S154). In the present embodiment, the status value "4" indicates the connection processing state of the telephone line. After the above S154 is performed, the program code instructions cause the main control unit 323 to end the telephone directory processing of FIG. 24.

When the result of the above S152 is affirmative (status value=0), the program code instructions cause the main control unit 323 to convert a telephone call into a line detectable command and notify the CPU 312 of the calling command (S155). After the above S155 is performed, the program code instructions cause the main control unit 323 to set the status value at 1 (S156). In the present embodiment, the status value "1" indicates the calling state of the telephone line. After the above S156 is performed, the program code instructions cause the main control unit 323 to transmit a line switching command to set the off-hook relay 310 in the off state and set the voice relay 311 in the on state, to the CPU 312 (S157). In the CCD 302, the CPU 312 controls the switching control unit 315 based on the command so that the off-hook relay is set in the off state and the voice relay 311 is set in the on state.

When the communication support system is placed in the above-mentioned conditions, the main control unit 323 performs the telephone directory processing which follows. When the result of the above S151 is negative, the telephone directory processing is performed and the above steps S152–S157 are not performed.

After the above S157 is performed (or when the result of the above S151 is negative), the program code instructions cause the main control unit 323 to set a variable "i" at 0 (S158). The program code instructions cause the main control unit 323 to determine whether the number of caller profile entries in a telephone directory of the database 324 is equal to 0 (S159).

When no caller profile entry is included in the telephone directory of the database 324, it is determined that the result of the above S159 is affirmative. In this case, the program code instructions cause the main control unit 323 to end the telephone directory processing of FIG. 24.

On the other hand, when at least one caller profile entry is included in the telephone directory of the database 324, it is determined that the result of the above S159 is negative. In this case, the program code instructions cause the main control unit 323 to retrieve a corresponding caller profile item for the variable "i" from the telephone directory of the database 324 (S160).

Figure 30A:
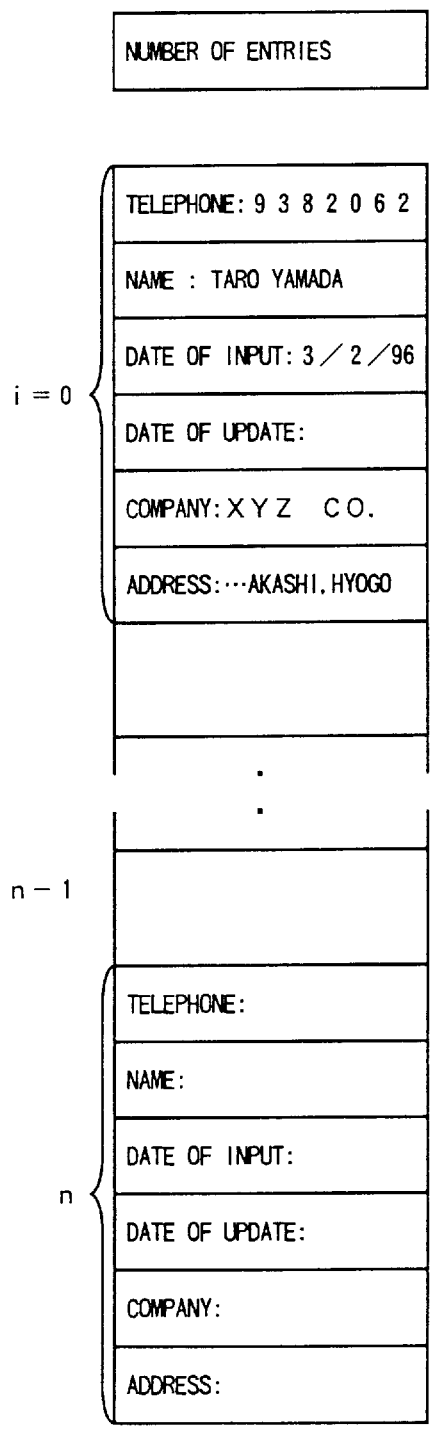
FIG. 30A and FIG. 30B are diagrams for explaining a further example of display data on the telephone device of the communication support system of FIG. 6.
Figure 30B:
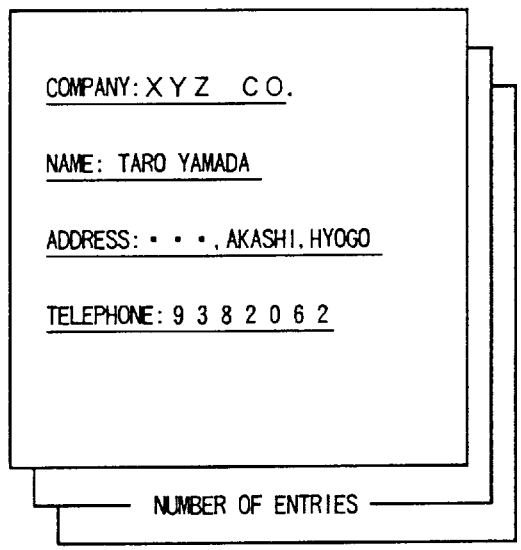
Figure 31:
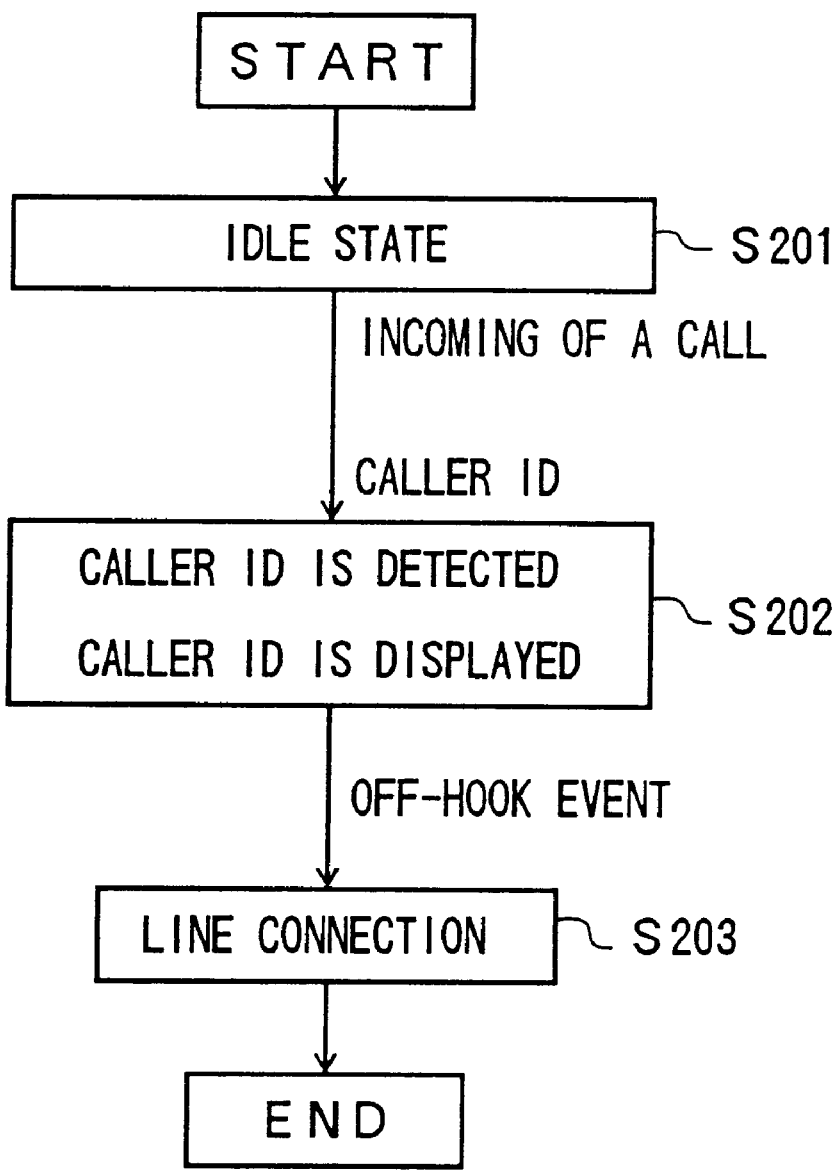
FIG. 31 is a flowchart for explaining an existing caller ID service processing of a conventional communication support system.

FIG. 30A shows a format of the telephone directory of the data management table of the database 324 in the present embodiment, and FIG. 30B shows an example of display data for the display 306.of the TD 301 with respect to the telephone directory.

After the above S160 is performed, the program code instructions cause the main control unit 323 to increment the variable "i" (i=i+1) (S161). The program code instructions cause the main control unit 323 to determine whether the variable "i" is equal to the number of caller profile entries in the telephone directory of the database 324 (S162).

When the result of the above S162 is negative, the program code instructions cause the main control unit 323 to repeat the above steps S160–S161 until all the caller profile entries in the telephone directory are read from the database 324 and the variable "i" is equal to the number of caller profile entries. When the result of the above S162 is affirmative, the program code instructions cause the main control unit 323 to transmit the telephone directory, including all the caller profile entries, to the display data multiplexer 320 via the bus 325 so that the multiplexer 320 transmits a multiplexed signal (including the telephone directory data) to the TS 305 via the telephone/PC interface 322 (S163). In the TD 301, the demultiplexer 308 separates the multiplexed signal into the telephone directory data and transmits the telephone directory data to the display 306. Therefore, the user of the TD 301 can know, upon incoming of the call, the telephone directory data on the display 306 of the TD 301 as shown in FIG. 30B, and it is not necessary for the user to go to the location of the DPD 303.

Further, FIG. 24 shows a caller profile entry processing performed by the communication support system of FIG. 6 in response to a DTMF signal sent by the TS when a dedicated button of the TS is pressed.

In the present embodiment, the user of the TD 301 presses a dedicated button of the TS 305 in the event analysis condition of the above S21 (see FIG. 8). The dedicated button of the TS 305 is specifically designed to transmit a DTMF signal to the CCD 302 when the dedicated button is pressed by the user, and the DTMF signal indicates the caller profile entry processing which is one of the plurality of telephone services provided by the DPD 303. The DTMF signal sent by the TS 305 is detected by the DTMF detection unit 318, and the CPU 312 notifies the main control unit 323 that the DTMF signal from the TD 301 is detected. The main control unit 323 at this time performs the caller profile entry processing of FIG. 24 in order to create the data management table in the database 324 as shown in FIG. 30A.

At the start of the caller profile entry processing of FIG. 24, the program code instructions cause the main control unit 323 to store a new caller profile item, sent from the TS 305, into the database 324 (S164). After the above S164 is performed, the program code instructions cause the main control unit 323 to increment the number of entries in the data management table of the database 324 so that the incremented number of entries is stored in the data management table of the database 324 (S165). After the above S132 is performed, the program code instructions cause the main control unit 323 to end the caller profile entry processing of FIG. 24.

Figure 25:
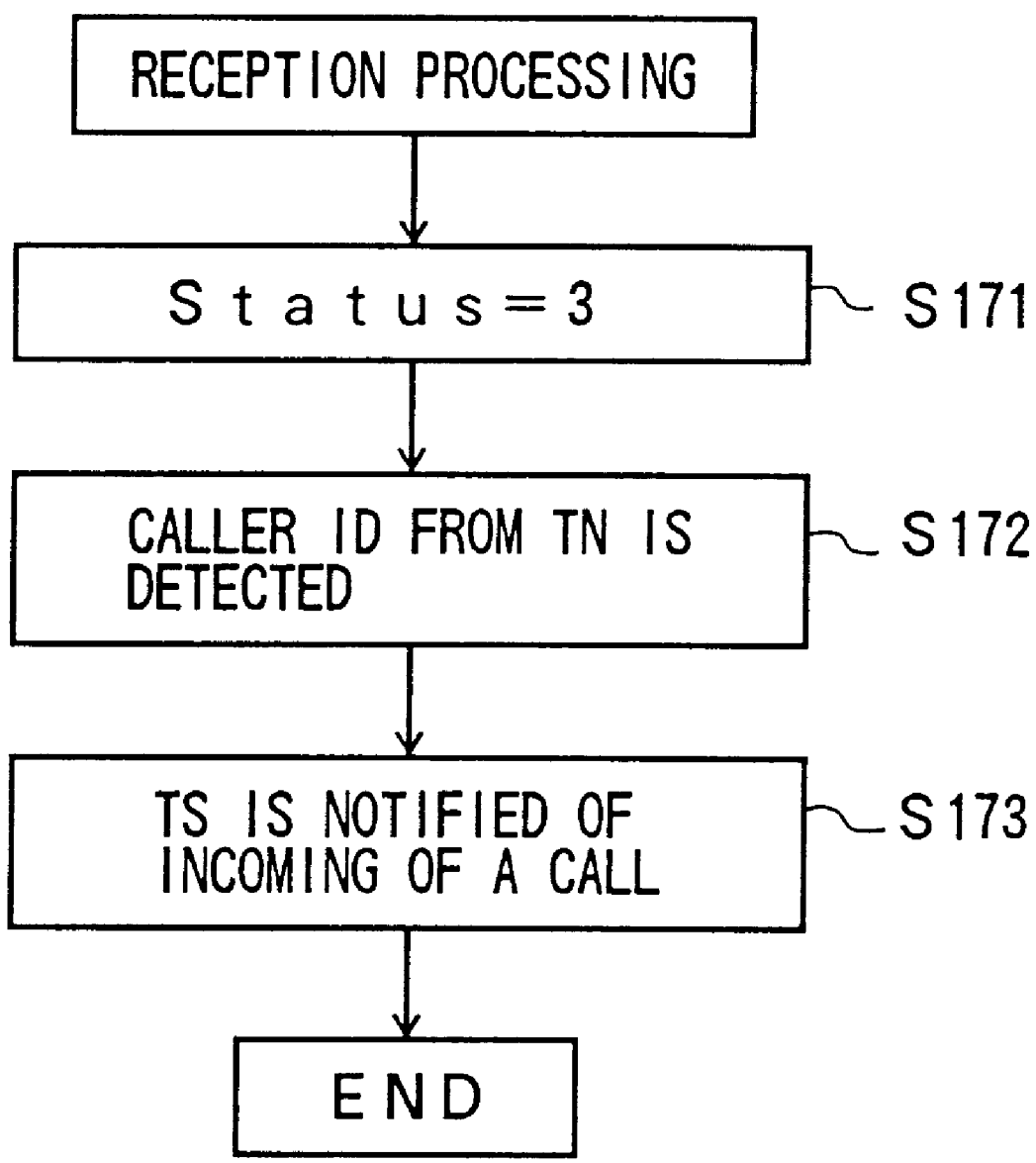
FIG. 25 is a flowchart for explaining a connection processing performed by the communication support system of FIG. 6 in response to a reception signal sent by the telephone set.

FIG. 25 shows a connection processing performed by the communication support system of FIG. 6 in response to a reception signal sent by the telephone set.

In the present embodiment, when an incoming call from the TN 304 is received by the CCD 302 during the event analysis condition of the above S71, the reception of the call is detected by the ringer detection unit 314. The CPU 312 notifies the main control unit 323 via the bus 325 that the reception of the call from the TN 304 is detected. In the DPD 303, the main control unit 323 performs the reception processing of FIG. 25.

At the start of the reception processing of FIG. 25, the program code instructions cause the main control unit 323 to set the status value at 3 (S171). In the present embodiment, the status value "3" indicates the reception state of the telephone line. The program code instructions cause the main control unit 323 to transmit a line switching command to set the voice relay 311 in the off state and set the off-hook relay 310 in the on state, to the CPU 312 (S171). In the CCD 302, the CPU 312 controls the switching control unit 315 based on the command so that the voice relay 311 is set in the off state and the off-hook relay 310 is set in the on state.

After the line switching of the above S171 is performed, the program code instructions cause the main control unit 323 to receive the caller ID from the TN 304 (S72). At this time, the caller ID from the TN 304 is detected by the caller ID detection unit 316 in the CCD 302, and the CPU 312 notifies the main control unit 323 of the caller ID detected via the bus 325. Further, the program code instructions cause the main control unit 323 to transmit a line switching command to set the off-hook relay 310 in the off state, to the CPU 312 (S172). In the CCD 302, the CPU 312 controls the switching control unit 315 based on the command so that the off-hook relay 310 is set in the off state.

After the line switching of the above S172 is performed, the program code instructions cause the main control unit 323 to notify the TS 305 that the reception of the call from the TN 304 is detected (S173). After the above S173 is performed, the program code instructions cause the main control unit 323 to end the reception processing of FIG. 25.

Figure 26:
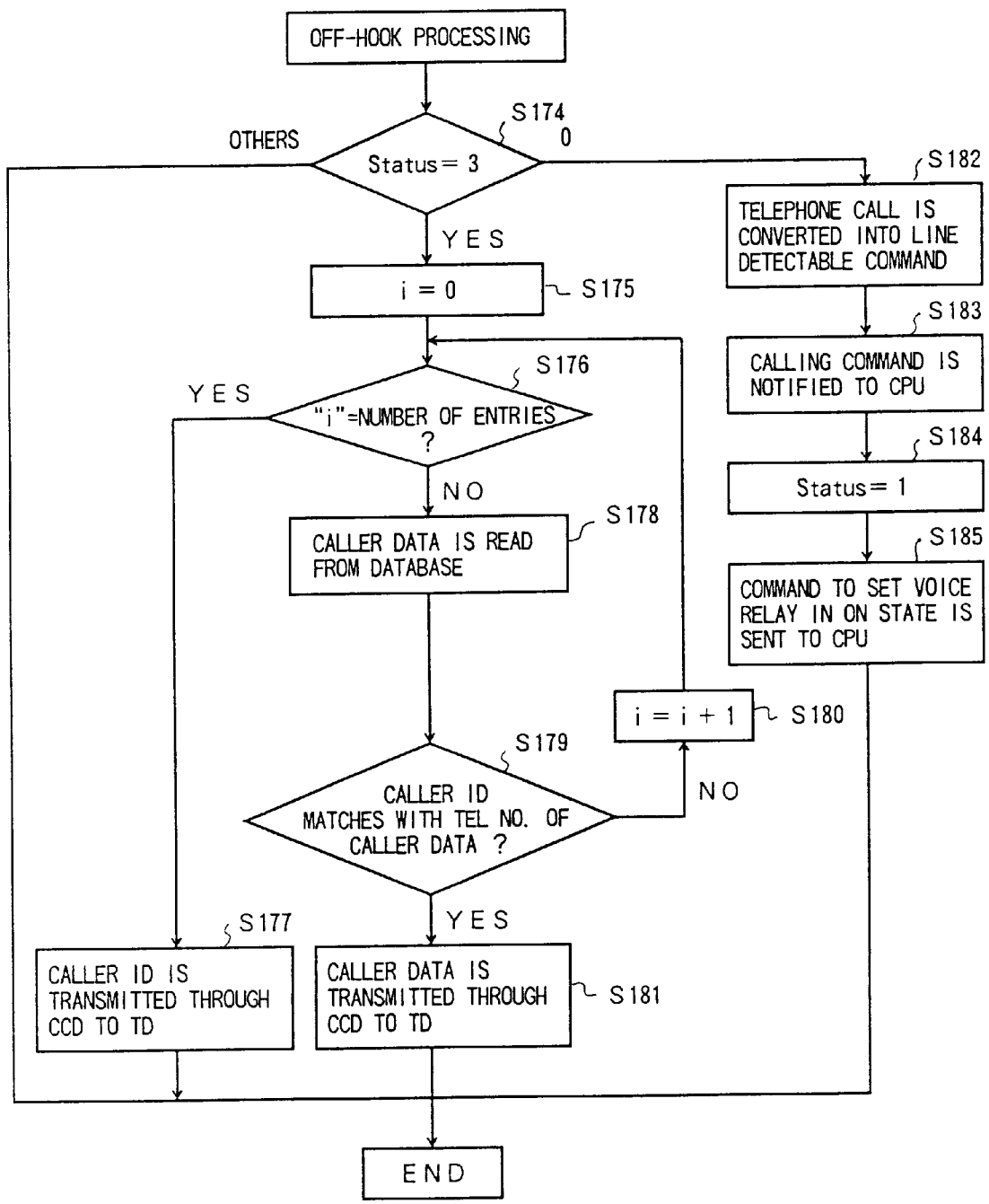
FIG. 26 is a flowchart for explaining an off-hook processing performed by the communication support system of FIG. 6 in response to an off-hook signal sent by the telephone set.

FIG. 26 shows an off-hook processing performed by the communication support system of FIG. 6 in response to an off-hook signal sent by the telephone set.

In the present embodiment, when the communication support system of FIG. 6 is placed in the above-mentioned condition after the end of the reception processing of FIG. 25, the user of the TD 301 may place the handset of the TS 305 in the off-hook state. In this case, in the CCD 302, the off-hook signal from the TS 305 is detected by the TS state detection unit 319, and the CPU 312 notifies the main control unit 323 via the bus 325 that the off-hook signal from the TS 305 is detected. The main control unit 323 at this time performs the off-hook processing of FIG. 26.

At the start of the off-hook processing of FIG. 26, the program code instructions cause the main control unit 323 to perform a status checking (S174). In the status checking of the above S174, the main control unit 323 determines whether the status value is currently equal to 3 (or 0).

When the status value is neither equal to 3 nor 0 in the above S174, the program code instructions cause the main control unit 323 to end the off-hook processing of FIG. 26.

When the status value is equal to 0, the program code instructions cause the main control unit 323 to convert a telephone call into a line detectable command (S182). The program code instructions cause the main control unit 323 to notify the CPU 312 of the calling command (S183). The program code instructions cause the main control unit 323 to set the status value of the telephone line at 1 (S184). In the present embodiment, the status value "1" indicates the calling state of the telephone line.

After the setting of the status value of the above S184 is performed, the program code instructions cause the main control unit 323 to transmit a line switching command to set the voice relay 311 in the on state, to the CPU 312 (S185). In the CCD 302, the CPU 312 controls the switching control unit 315 based on the command so that the voice relay 311 is set in the on state in order to establish the connection between the TS 305 and the TN 304. After the above S185 is performed, the program code instructions cause the main control unit 323 to end the off-hook processing of FIG. 26.

When the status value is equal to 3 in the status checking of the above S174, the program code instructions cause the main control unit 323 to retrieve corresponding caller profile in the database 324 for the caller ID, as follows.

The program code instructions cause the main control unit 323 to set a variable "i" at 0 (S175). The program code instructions cause the main control unit 323 to determine whether the variable "i" is equal to the number of caller profile entries in a data management table of the database 324 (S176).

When no caller profile entry is included in the data management table of the database 324, it is determined that the result of the above S176 is affirmative. In this case, the program code instructions cause the main control unit 323 to transmit the caller ID (the telephone number) to the display data multiplexer 320 via the bus 325 so that the multiplexer 320 transmits a multiplexed signal (including the caller ID) to the TS 305 via the telephone/PC interface 322 (S177). In the TD 301, the demultiplexer 308 separates the multiplexed signal into the caller ID and transmits the caller ID to the display 306. Therefore, the user of the TD 301 can know, upon incoming of the call, the caller ID on the display 306, and it is not necessary for the user to go to the location of the DPD 303.

On the other hand, when at least one caller profile entry is included in the data management table of the database 324, it is determined that the result of the above S176 is negative. In this case, the program code instructions cause the main control unit 323 to retrieve a corresponding caller profile item for the variable "i" from the data management table of the database 324 (S178).

After the above S178 is performed, the program code instructions cause the main control unit 323 to determine whether a telephone number of the caller profile (the data item for the variable "i") read from the database 324 matches with the caller ID from the TN 304 (S179).

When the result of the above S179 is negative, the program code instructions cause the main control unit 323 to increment the variable "i" (i=i+1) (S180). The program code instructions cause the main control unit 323 to repeat the above steps S176–S180 until the result of the above S179 becomes affirmative.

When the result of the above S179 is affirmative, it is determined that the caller profile read from the database 324 in the above S178 matches with the caller ID from the TN 304. In this case, the program code instructions cause the main control unit 323 to transmit the caller profile (for example, the caller name and other information) to the display data multiplexer 320 via the bus 325 so that the multiplexer 320 transmits a multiplexed signal (including the caller profile) to the TS 305 via the telephone/PC interface 322 (S181). In the TD 301, the demultiplexer 308 separates the multiplexed signal into the caller profile and transmits the caller profile to the display 306. Therefore, the user of the TD 301 can know, upon incoming of the call, the caller profile on the display 306 of the TD 301 as shown in FIG. 28B, and it is not necessary for the user to go to the location of the DPD 303.

After the above S177 or the above S181 is performed, the program code instructions cause the main control unit 323 to end the reception processing of FIG. 26.

Figure 27:
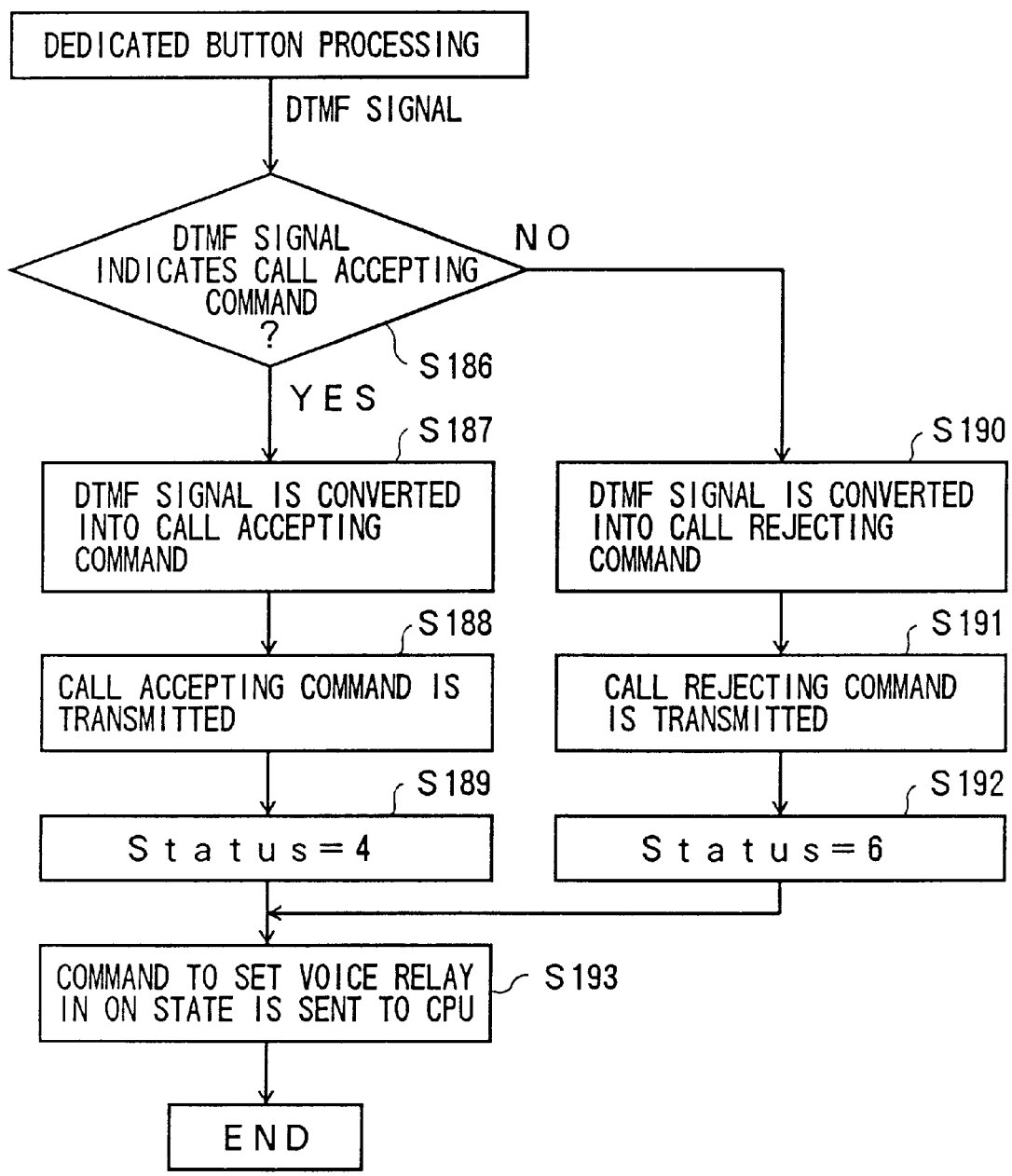
FIG. 27 is a flowchart for explaining a dedicated button processing performed by the communication support system of FIG. 6 in response to a control signal sent by the telephone set.

FIG. 27 shows a dedicated button processing performed by the communication support system of FIG. 6 in response to a control signal sent by the telephone set.

In the present embodiment, when the communication support system of FIG. 6 is placed in the above-mentioned condition after the end of the reception processing of FIG. 26, the user of the TD 301 may press the dedicated button of the TS 305 which transmits a DTMF signal to the CCD 302. As described above, after the caller profile on the display 306 is confirmed, the user presses the dedicated button of the TS 305. In the CCD 302, at this time, the DTMF signal from the TS 305 is detected by the DTMF detection unit 318, and the CPU 312 notifies the main control unit 323 via the bus 325 that the DTMF signal from the TS 305 is detected. The main control unit 323 at this time performs the dedicated button processing of FIG. 27.

At the start of the off-hook processing of FIG. 27, the program code instructions cause the main control unit 323 to determine whether the content of the DTMF signal detected by the DTMF detection unit 318 matches with a line connection command to connect the TD 301 and the TN 304 through the CCD 302 (S186).

When the result of the above S186 is affirmative, the program code instructions cause the main control unit 323 to transmit a line switching command to set the off-hook relay 310 in the on state to the CPU 312 and convert the DTMF signal into a line detectable command (or the line connection command) (S187). In the CCD 302, the CPU 312 controls the switching control unit 315 based on the command so that the off-hook relay 310 is set in the on state. The program code instructions cause the main control unit 323 to transmit the line connection command to the telephone line via the line interface 313 through the CPU 312 (S188).

After the above S188 is performed, the program code instructions cause the main control unit 323 to set the status value at 4 (S189). In the present embodiment, the status value "4" indicates the connection processing state of the telephone line. After the above S189 is performed, the program code instructions cause the main control unit 323 to transmit a line switching command to set the voice relay 311 in the on state, to the CPU 312 (S193). In the CCD 302, the CPU 312 controls the switching control unit 315 based on the command so that the voice relay 311 is set in the on state. After the above S193 is performed, the program code instructions cause the main control unit 323 to end the dedicated button processing of FIG. 27.

On the other hand, when the result of the above S186 is negative, the program code instructions cause the main control unit 323 to transmit a line switching command to set the off-hook relay 310 in the on state to the CPU 312 and convert the DTMF signal into a line detectable command (or a line disconnection command) (S190). In the CCD 302, the CPU 312 controls the switching control unit 315 based on the command so that the off-hook relay 310 is set in the on state. The program code instructions cause the main control unit 323 to transmit the line disconnection command to the telephone line via the line interface 313 through the CPU 312 (S191).

After the above S191 is performed, the program code instructions cause the main control unit 323 to set the status value at 6 (S192). In the present embodiment, the status value "6" indicates the disconnection state of the telephone line. After the above S189 is performed, the program code instructions cause the main control unit 323 to perform the line switching of the above S193.

Further, the present invention is not limited to the above-described embodiments, and variations and modifications may be made without departing from the present invention.

What is claimed is:

1. A communication support system which is adapted to connect a telephone set through a communication control device to a data processing device and adapted to connect a telephone network to the communication control device, the communication support system comprising:

the communication control device having a voice interface and a computer interface;

the data processing device connected to the communication control device through the voice interface and the computer interface;

a caller ID detection unit, provided in the communication control device for detecting a caller ID sent from the telephone network upon incoming of a call;

a line switching unit, provided in the communication control device, for switching on a first line between a voice signal path from the telephone set and a voice signal path from the telephone network before a voice connection between the telephone set and the telephone network is established, and for switching off the first line and switching on a second line between the voice signal path from the telephone set and a voice signal path from the data processing device in response to a line switching command remotely transmitted by the data processing device after the caller ID is detected by the caller ID detection unit; and a control unit, provided in the data processing device, for retrieving a caller profile from a database of the data processing device in response to the caller ID received from the caller ID detection unit though the computer interface, and for sending a synthesized voice signal indicating the caller profile to the telephone set through the voice interface and the second line of the communication control device after the line switching unit switches on the second line wherein, when an off-hook state of the telephone set is detected, the control unit transmits the line switching command to the communication control device through the computer interface, so as to cause the line switching unit to switch off the first line and switch on the second line.

2. The communication support system according to claim 1, wherein the communication control device comprises:

a control signal detection unit for detecting a control signal sent by the telephone set after the voice signal from the data processing device is received by the telephone set; and a voice relay for switching on and off a connection line between the telephone set and the telephone network, wherein the voice relay switches on the connection line when the control signal is detected by the control signal detection unit, so that the connection between the telephone set and the telephone network is established.

3. A communication control device adapted to connect a telephone set and a data processing device through the communication control device and adapted to connect a telephone network to the communication control device, comprising:

a caller ID detection unit for detecting a caller ID sent from the telephone network upon incoming of a call; and a line switching unit for switching on a first line between a voice signal path from the telephone set and a voice signal path from the telephone network before a voice connection between the telephone set and the telephone network is established, and for switching off the first line and switching on a second line between the voice signal path from the telephone set and a voice signal path from the data processing device in response to a line switching command remotely transmitted by the data processing device after the caller ID is detected by the caller ID detection unit, wherein the communication control device is connected to the data processing device through a voice interface and a computer interface, wherein a synthesized voice signal indicating a caller profile retrieved from a database of the data processing device is transmitted to the telephone set through the voice interface and the second line of the communication control device after the line switching unit switches on the second line and switches off the first line in response to the line switching command remotely transmitted by the data processing device.

4. The communication control device according to claim 3, further comprising:

a control signal detection unit for detecting a control signal sent by the telephone set after the voice signal from the data processing device is received by the telephone set; and a voice relay for switching on and off a connection line between the telephone set and the telephone network, wherein the voice relay switches on the connection line when the control signal is detected by the control signal detection unit, so that the connection between the telephone set and the telephone network is established.

5. A communication support system which is adapted to connect a telephone device through a communication control device to a data processing device and adapted to connect a telephone network to the communication control device, the communication support system comprising:

the communication control device having a bus;

the data processing device connected to the communication control device through the bus;

a first multiplexer, provided in the communication control device, having inputs connected to a display data path from the data processing device and a voice signal path from the telephone network and an output connected to the telephone device via an interface, the first multiplexer transmitting a multiplexed signal, including display data from the data processing device and a voice signal from the telephone network, to the telephone device upon incoming of a call; and the telephone device having a display and a demultiplexer having an input connected to the first multiplexer via the interface and having an output connected to the display, wherein the demultiplexer separates the multiplexed signal from the first multiplexer into the display data and the voice signal, the display data being transmitted to the display so that the display data is displayed on the telephone device upon incoming of the call;

a caller ID detection unit, provided in the communication control device, for detecting a caller ID sent from the telephone network upon incoming of the call; and a line switching unit, provided in the communication control device, for switching on a first connection line between a voice signal path from the telephone device and the voice signal path from the telephone network before a voice connection between the telephone device and the telephone network is established, and for switching off a second connection line between the telephone network and the communication control device in response to a command remotely transmitted by the data processing device after the caller ID is detected by the caller ID detection unit;

wherein the data processing device retrieves a caller profile from a database of the data processing device in response to the caller ID received from the caller ID detection unit, and transmits a display data signal indicating the caller profile to the telephone device through the communication control device after the line switching unit switches off the second connection line, wherein the data processing device remotely transmits, after the caller ID is detected, the command to the communication control device through the bus, so as to cause the line switching unit to switch off the second connection line.

6. The communication support system according to claim 5, wherein the telephone device further comprises a telephone set and a second multiplexer for transmitting a multiplexed signal, including a voice signal and a control signal from the telephone set, to the communication control device via the interface, and wherein the communication control device comprises a demultiplexer for separating the multiplexed signal from the second multiplexer into the voice signal and the control signal.

7. The communication support system according to claim 5, wherein the display data signal transmitted by the data processing device includes the caller ID sent from the telephone network.

8. The communication support system according to claim 5, wherein the display data signal transmitted by the data processing device includes both the caller ID sent from the telephone network and the caller profile retrieved from the database in response to the caller ID.

9. The communication support system according to claim 5, wherein the communication control device comprises a control signal detection unit for detecting a control signal sent by the telephone device, and wherein the display data from the data processing device includes a command list read from the data processing device.

10. The communication support system according to claim 9, wherein the display data from the data processing device includes a telephone directory read from the data processing device in response to the control signal detected by the control signal detection unit, the telephone directory including a plurality of caller profiles.

11. The communication support system according to claim 5, wherein the communication control device comprises:

a control signal detection unit for detecting a control signal sent by the telephone device; and a line switching unit for switching on and off a connection line between a voice signal path from the telephone device and the voice signal path from the telephone network, wherein a connection between the telephone set and the telephone network is established after the control signal is detected by the control signal detection unit and the connection line is switched on by the line switching unit in response to the control signal.

12. A communication control device adapted to connect a telephone device and a data processing device through the communication control device and adapted to connect a telephone network to the communication control device, comprising:

a first multiplexer having inputs connected to a display data path from the data processing device and a voice signal path from the telephone network and an output connected to the telephone device via an interface, the first multiplexer transmitting a multiplexed signal, including display data from the data processing device and a voice signal from the telephone network, to the telephone device upon incoming of a call, a caller ID detection unit for detecting a caller ID sent from the telephone network upon incoming of the call; and a line switching unit for switching on a first connection line between a voice signal path from the telephone device and the voice signal path from the telephone network before a voice connection between the telephone device and the telephone network is established, and for switching off a second connection line between the telephone network and the communication control device in response to a command remotely transmitted by the data processing device after the caller ID is detected by the caller ID detection unit, wherein the data processing device retrieves a caller profile from a database of the data processing device in response to the caller ID received from the caller ID detection unit, and transmits a display data signal indicating the caller profile to the telephone device through the communication control device after the line switching unit switches off the second connecting line, wherein the data processing device remotely transmits, after the caller ID is detected, the command to the communication control device through the bus, so as to cause the line switching unit to switch off the second connection line, wherein the telephone device comprises a display and a demultiplexer having an input connected to the first multiplexer via the interface and having an output connected to the display, and the demultiplexer separates the multiplexed signal from the first multiplexer into the display data and the voice signal, the display data being transmitted to the display so that the display data is displayed on the telephone device upon incoming of the call.

13. The communication control device according to claim 12, further comprising:

a control signal detection unit for detecting a control signal sent by the telephone device;

wherein a connection between the telephone device and the telephone network is established after the control signal is detected by the control signal detection unit and the first connection line is switched on by the line switching unit in response to the control signal.

14. A telephone device for use with a communication control device having a bus, a caller ID detection unit, and a line switching unit, adapted to connect the telephone device and a data processing device connected to the communication control device through the bus and adapted to connect a telephone network to the communication control device, wherein the communication control device includes a first multiplexer provided in the communication control device having inputs connected to a display data path from the data processing device and a voice signal path from the telephone network and an output connected to the telephone device via an interface, the first multiplexer transmitting a multiplexed signal, including display data from the data processing device and a voice signal from the telephone network, to the telephone device upon incoming of a-call, the telephone device comprising:

a telephone set;

a display;

a demultiplexer having an input connected to the first multiplexer via the interface and having an output connected to the display, wherein the demultiplexer separates the multiplexed signal from the first multiplexer into the display data and the voice signal, the display data being transmitted to the display so that the display data is displayed on the telephone device upon incoming of the call; and a second multiplexer for transmitting a multiplexed signal, including a voice signal and a control signal from the telephone set, to the communication control device via the interface;

wherein the a caller ID detection unit detects a caller ID sent from the telephone network upon incoming of the call, the line switching unit switches on a first connection line between a voice signal path from the telephone device and the voice signal path from the telephone network before a voice connection between the telephone device and the telephone network is established, and further switches off a second connection line between the telephone network and the communication control device in response to a command remotely transmitted by the data processing device after the caller ID is detected by the caller ID detection unit;

wherein the data processing device retrieves a caller profile from a database of the data processing device in response to the caller ID received from the caller ID detection unit, and transmits a display data signal indicating the caller profile to the telephone device through the communication control device after the line switching unit switches off the second connection line, wherein the data processing device remotely transmits after the caller ID is detected, the command to the communication control device through the bus, so as to cause the line switching unit to switch off the second connection line.

15. A method of executing a telephone service processing in a communication support system which is adapted to connect a telephone set through a communication control device having a voice interface and a computer interface to a data processing device connected to the communication control device through the voice interface and the computer interface; and adapted to connect a telephone network to the communication control device, the method comprising the steps of:

detecting a caller ID sent from the telephone network upon incoming of a call;

switching off a first line between a voice signal path from the telephone set and a voice signal path from the telephone network and switching on a second line between the voice signal path from the telephone set and a voice signal path from the data processing device switching on a second line between the voice signal path from the telephone set and a voice signal path from the data processing device in response to a line switching command remotely transmitted by the data processing device after the caller ID is detected;

retrieving a caller profile from the data processing device in response to the caller ID;

transmitting a synthesized voice signal indicating the caller profile to the telephone set through the second line;

switching on the first line before a voice connection between the telephone set and the telephone network is established;

detecting an off-hook state of the telephone set; and transmitting the line switching command to the communication control device through the computer interface, so as to cause switching off the first line and switching on the second line.

16. A method of executing a telephone service processing in a communication support system which is adapted to connect a telephone device through a communication control device having a bus, connected through said bus to a data processing device and adapted to connect a telephone network to the communication control device, the method comprising the steps of:

receiving display data from the data processing device and a voice signal from the telephone network by the communication control device upon incoming of a call, the display data including a caller profile retrieved from the data processing device in response to a caller ID sent from the telephone network;

transmitting a multiplexed signal, including the display data and the voice signal, to the telephone device;

separating the multiplexed signal into the display data and the voice signal by the telephone device; and transmitting the display data to a display of the telephone device so that the display data is displayed on the telephone device before a connection between the telephone device and the telephone network is established detecting a caller ID sent from the telephone network upon incoming of the call, switching on a first connection line between a voice signal path from the telephone device and a voice signal path from the telephone network before a voice connection between the telephone device and the telephone network is established, and switching off a second connection line between the telephone network and the communication control device in response to a command remotely transmitted by the data processing device after the caller ID is detected;

retrieving a caller profile from a database of the data processing device in response to the detected caller ID;

transmitting a display data signal indicating the caller profile to the telephone device through the communication control device after switching off the second connection line; and transmitting after the caller ID is detected, the command to the communication control device through the bus, so as to cause a switching off of the second connection line.

17. A computer readable medium storing program code for causing a processor to execute a telephone service processing in a communication support system which is adapted to connect a telephone set through a communication control device having a voice interface and a computer interface to a data processing device, the data processing device connected to the communication control device through the voice interface and the computer interface, and adapted to connect a telephone network to the communication control device, comprising:

first program code means to cause the processor to detect a caller ID sent from the telephone network upon incoming of a call;

second program code means to cause the processor to switch off a first line between a voice signal path from the telephone set and a voice signal path from the telephone network and switch on a second line between the voice signal path from the telephone set and a voice signal path from the data processing device after the caller ID is detected;

third program code means to cause the processor to retrieves a caller profile from the data processing device in response to the caller ID;

fourth program code means to cause the processor to transmit a synthesized voice signal indicating the caller profile to the telephone set through the second line; and fifth program code means to cause the processor to switch on the first line before a voice connection between the telephone set and the telephone network is established sixth program code means to detect an off-hook state of the telephone set, wherein after said sixth program code means detects the off-hook state, the third program code means transmits a line switching command to the communication control device through the computer interface, so as to cause the second program control means to switch off the first line and switch on the second line.

18. A computer readable medium storing program code for causing a processor to execute a telephone service processing in a communication support system which is adapted to connect a telephone device through a communication control device to a data processing device and adapted to connect a telephone network to the communication control device, comprising:

first program code means to cause the processor to receive display data from the data processing device and a voice signal from the telephone network by the communication control device upon incoming of a call, the display data including a caller profile retrieved from the data processing device in response to a caller ID sent from the telephone network;

second program code means to cause the processor to transmit a multiplexed signal, including the display data and the voice signal, to the telephone device;

third program code means to cause the processor to separate the multiplexed signal into the display data and the voice signal by the telephone device; and fourth program code means to cause the processor to transmit the display data to a display of the telephone device so that the display data is displayed on the telephone device before a connection between the telephone device and the telephone network is established;

fifth program code means to detect a caller ID sent from the telephone network upon incoming of the call; and sixth program means to switch on a first connection line between a voice signal path from the telephone device and a voice signal path from the telephone network before a voice connection between the telephone device and the telephone network is established, and to switch off a second connection line between the telephone network and the communication control device in response to a command remotely transmitted by the data processing device after the caller ID is detected by the fifth program code means;

wherein the data processing device retrieves a caller profile from a database of the data processing device in response to the caller ID received from fifth program code means, and transmits a display data signal indicating the caller profile to the telephone device through the communication control device after the sixth program means switches off the second connection line, wherein the data processing device remotely transmits after the caller ID is detected, the command to the communication control device through the bus, so as to cause the line switching unit to switch off the second connection line.

* * * * *

UNITED STATES PATENT AND TRADEMARK OFFICE
CERTIFICATE OF CORRECTION

PATENT NO. : 6,240,165 B1
DATED : May 29, 2001
INVENTOR(S) : Katsutoshi Yano, et al.

It is certified that error appears in the above-identified patent and that said Letters Patent is hereby corrected as shown below:

Title page,
Item [57], line 14, change "a." to -- a --.

Column 36,
Line 31, after "wherein" delete "the".

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*